United States Patent
Cheng et al.

(10) Patent No.: US 11,625,121 B2
(45) Date of Patent: Apr. 11, 2023

(54) DETECTION METHOD AND DRIVING CIRCUIT THEREOF

(71) Applicant: NOVATEK Microelectronics Corp., Hsin-Chu (TW)

(72) Inventors: Yen-Cheng Cheng, Hsinchu (TW); Shih-Chan Huang, Hsinchu County (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 0 days.

(21) Appl. No.: 17/693,403

(22) Filed: Mar. 13, 2022

(65) Prior Publication Data

US 2022/0334701 A1    Oct. 20, 2022

Related U.S. Application Data

(60) Provisional application No. 63/171,583, filed on Apr. 7, 2021, provisional application No. 63/245,205, filed on Sep. 17, 2021.

(51) Int. Cl.
| | | |
|---|---|---|
| *G06F 3/041* | (2006.01) | |
| *G06F 3/044* | (2006.01) | |
| *H04W 72/04* | (2023.01) | |
| *G06F 3/038* | (2013.01) | |
| *G06F 3/0354* | (2013.01) | |

(52) U.S. Cl.
CPC ........ *G06F 3/04166* (2019.05); *G06F 3/0383* (2013.01); *G06F 3/03545* (2013.01); *G06F 3/0441* (2019.05); *G06F 3/0442* (2019.05); *G06F 3/04162* (2019.05); *H04W 72/0413* (2013.01)

(58) Field of Classification Search
CPC ........................ G06F 3/04166; G06F 3/0441
See application file for complete search history.

(56) References Cited

U.S. PATENT DOCUMENTS

| | | | |
|---|---|---|---|
| 9,830,000 | B2 | 11/2017 | Westhues |
| 2018/0088691 | A1 | 3/2018 | Westhues |
| 2018/0113519 | A1* | 4/2018 | Yamamoto .......... G06F 3/03545 |
| 2020/0210021 | A1 | 7/2020 | Ju |
| 2021/0286494 | A1* | 9/2021 | Perez .................. G06F 3/03545 |
| 2022/0200337 | A1* | 6/2022 | Watanabe ............. G06F 3/0441 |

FOREIGN PATENT DOCUMENTS

| | | |
|---|---|---|
| CN | 109582170 A | 4/2019 |
| CN | 111492331 A | 8/2020 |
| EP | 3 462 291 A1 | 4/2019 |
| TW | 202014854 A | 4/2020 |
| TW | 202038062 A | 10/2020 |

* cited by examiner

Primary Examiner — Chun-Nan Lin
(74) Attorney, Agent, or Firm — Winston Hsu

(57) ABSTRACT

A detection method for a touch device includes transmitting a first uplink signal conforming to a first protocol of a first active stylus and transmitting a second uplink signal conforming to a second protocol of a second active stylus. A chronological sequence of the first uplink signal and the second uplink signal is based at least in part on whether the first active stylus or the second active stylus has just left a detection range of the touch device.

12 Claims, 12 Drawing Sheets

DETECTION METHOD AND DRIVING CIRCUIT THEREOF

CROSS REFERENCE TO RELATED APPLICATIONS

This application claims the benefit of U.S. provisional application No. 63/171,583 filed on Apr. 7, 2021, and U.S. provisional application No. 63/245,205 filed on Sep. 17, 2021, which are all incorporated herein by reference.

BACKGROUND OF THE INVENTION

1. Field of the Invention

The present invention relates to a detection method and a driving circuit thereof, and more particularly, to a detection method and a driving circuit thereof for active styluses of different protocols to improve efficiency and user experience.

2. Description of the Prior Art

Styluses of various types have been widely used as inputting devices on a display panel of an electronic device. Position detection of a stylus, which provides input to the electronic device and is interpreted as user commands, is performed when the stylus tip is either touching or hovering over the display panel. The position of the stylus over the display panel is correlated with virtual information portrayed on the display panel. However, there is still room for improvement when it comes to the detection of active styluses of different protocols using one electronic device.

SUMMARY OF THE INVENTION

In order to solve aforementioned problem(s), the present invention provides a detection method and a driving circuit thereof, which are configured for active styluses of different protocols and thereby improve efficiency and user experience.

The present invention discloses a detection method, for a touch device, comprising transmitting a first uplink signal conforming to a first protocol of a first active stylus; and transmitting a second uplink signal conforming to a second protocol of a second active stylus, wherein a chronological sequence of the first uplink signal and the second uplink signal is based at least in part on whether the first active stylus or the second active stylus has just left a detection range of the touch device.

The present invention further discloses a driving circuit, comprising a processing circuit and a storage circuit coupled to the processing circuit. The processing circuit is configured to direct steps of transmitting a first uplink signal conforming to a first protocol of a first active stylus; and transmitting a second uplink signal conforming to a second protocol of a second active stylus, wherein a chronological sequence of the first uplink signal and the second uplink signal is based at least in part on whether the first active stylus or the second active stylus has just left a detection range of the touch device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
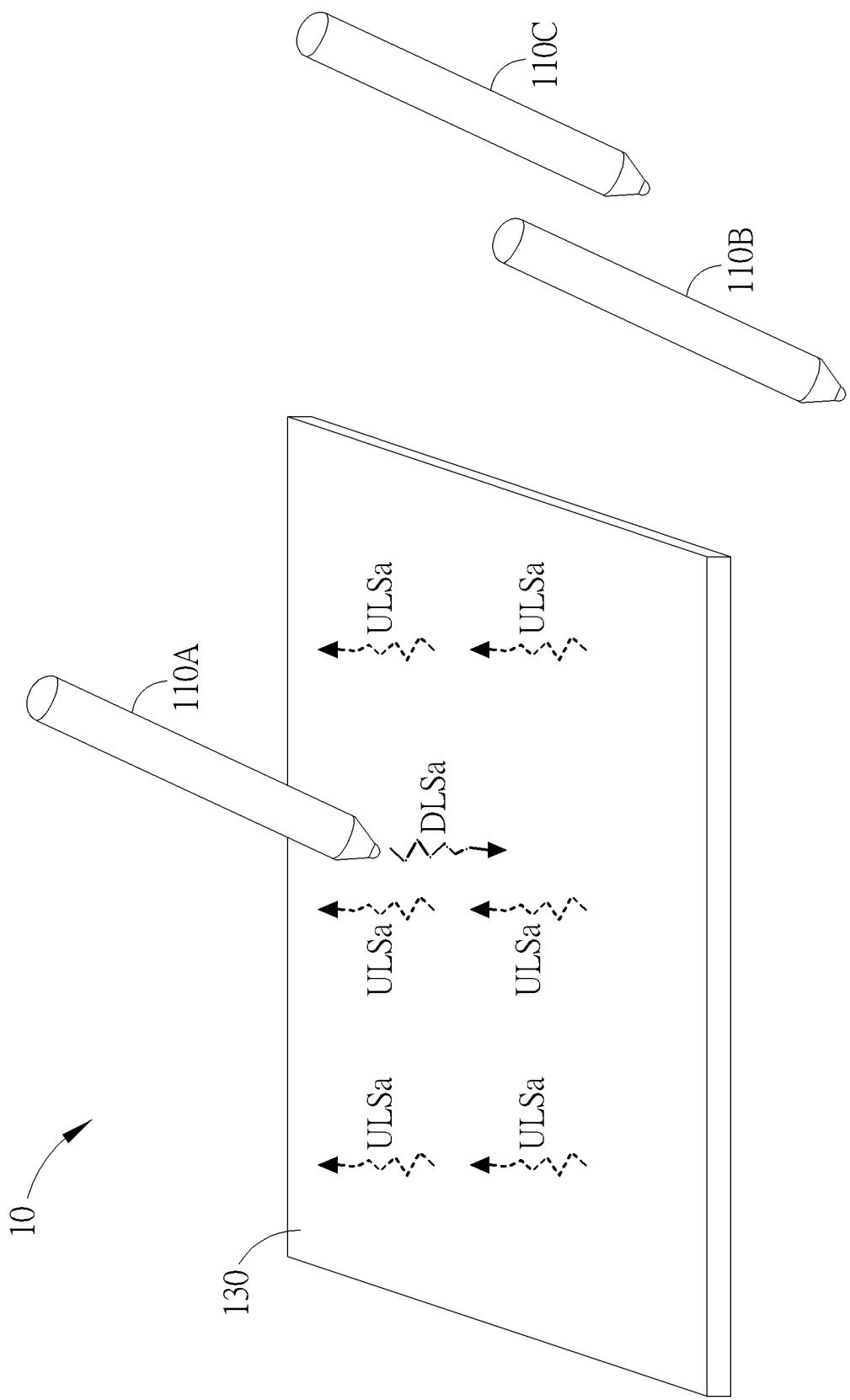
FIGS. 1 and 2 are schematic diagrams of a system according to an embodiment of the present invention.
Figure 2:
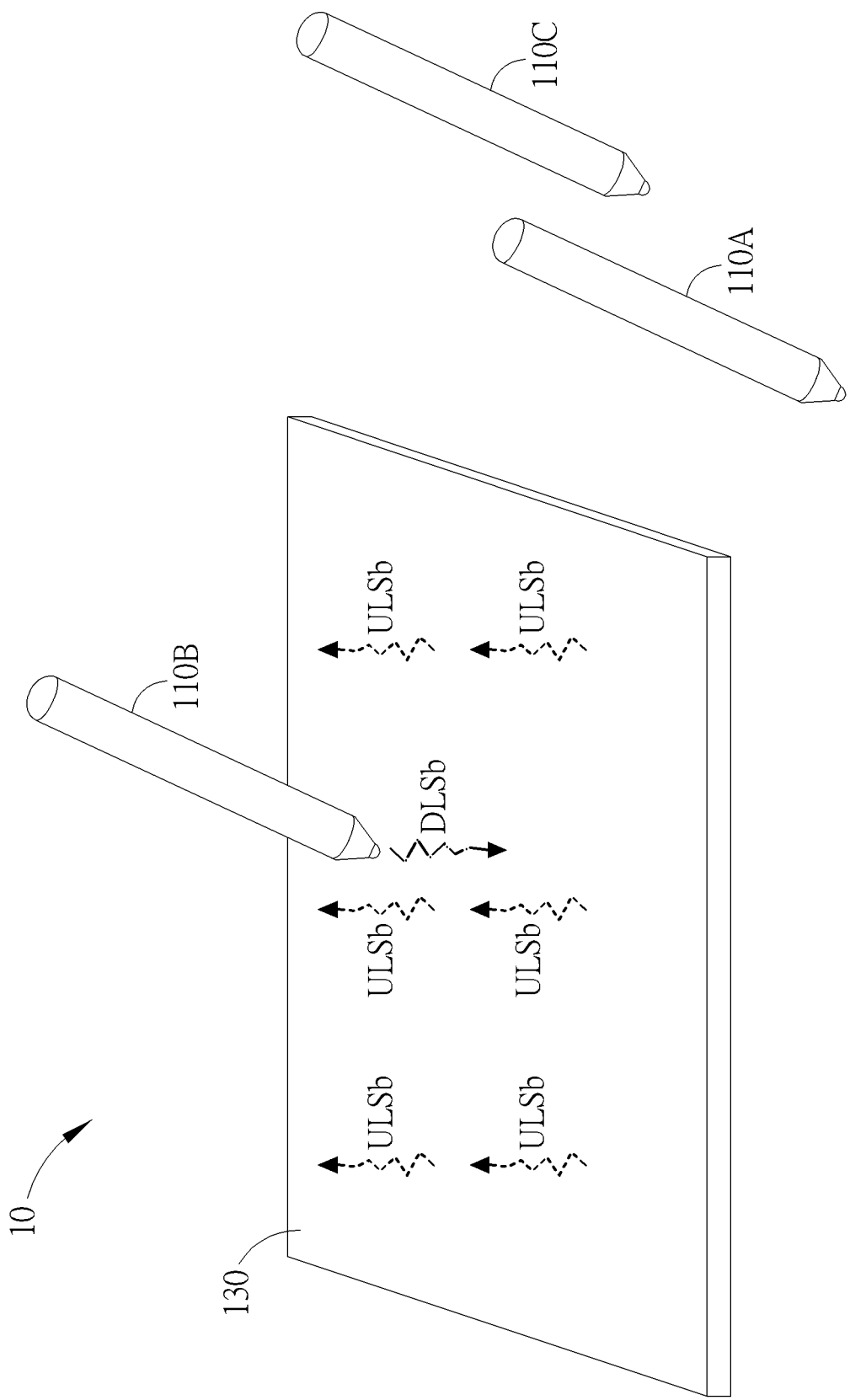

FIGS. 1 and 2 are schematic diagrams of a system 10 according to an embodiment of the present invention. The system 10 may include active styluses 110A to 110C and a touch device 130. The active stylus 110A is configured to receive uplink signals ULSa conforming to a (first) protocol from the touch device 130 or transmit downlink signal(s) DLSa conforming to the (first) protocol to the touch device 130. Similarly, the active stylus 110B is configured to receive uplink signal(s) ULSb conforming to a (second) protocol from the touch device 130 or transmit downlink signal(s) DLSb conforming to the (second) protocol to the touch device 130.

The (first) protocol of the active stylus 110A may differ from the (second) protocol of the active stylus 110B. To detect/communicate with both the active styluses 110A and 110B, the touch device 130 emits the uplink signals ULSa and ULSb. The chronological sequence of the uplink signals ULSa and ULSb or the frequency of transmitting the uplink signal ULSa or ULSb (namely, the number of occurrences of transmitting the uplink signal ULSa or ULSb within a specific time interval) may be associated with whether the active stylus 110A or 110B has just left/entered the detection range of the touch device 130. As a result, the active stylus, which has just move away from and then back into the detection range of the touch device 130, may be found by the touch device 130 rapidly.

Figure 3:
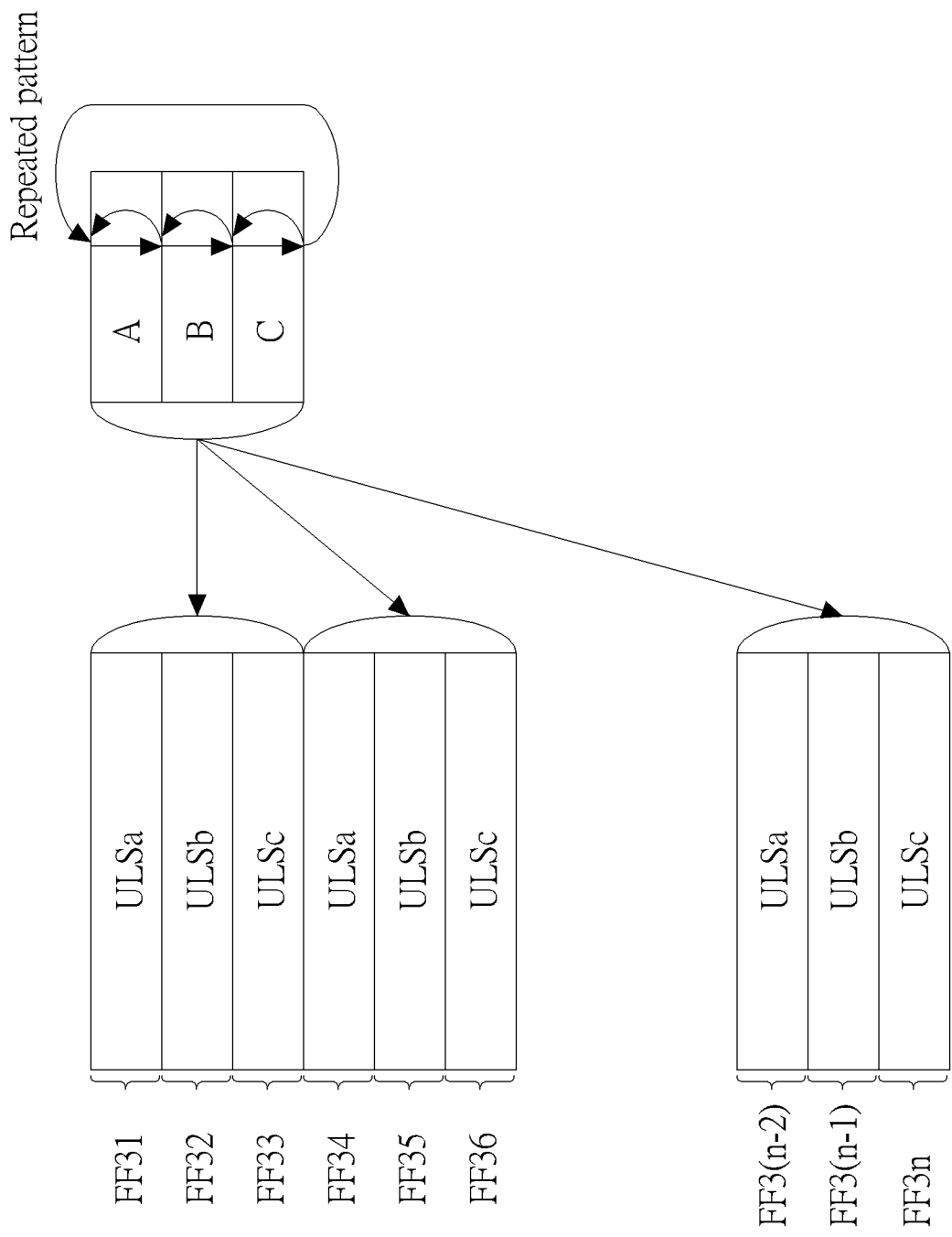
FIG. 3 is a sequence diagram for a touch device when no active stylus touches/hovers over the touch device according to an embodiment of the present invention.
Figure 4:
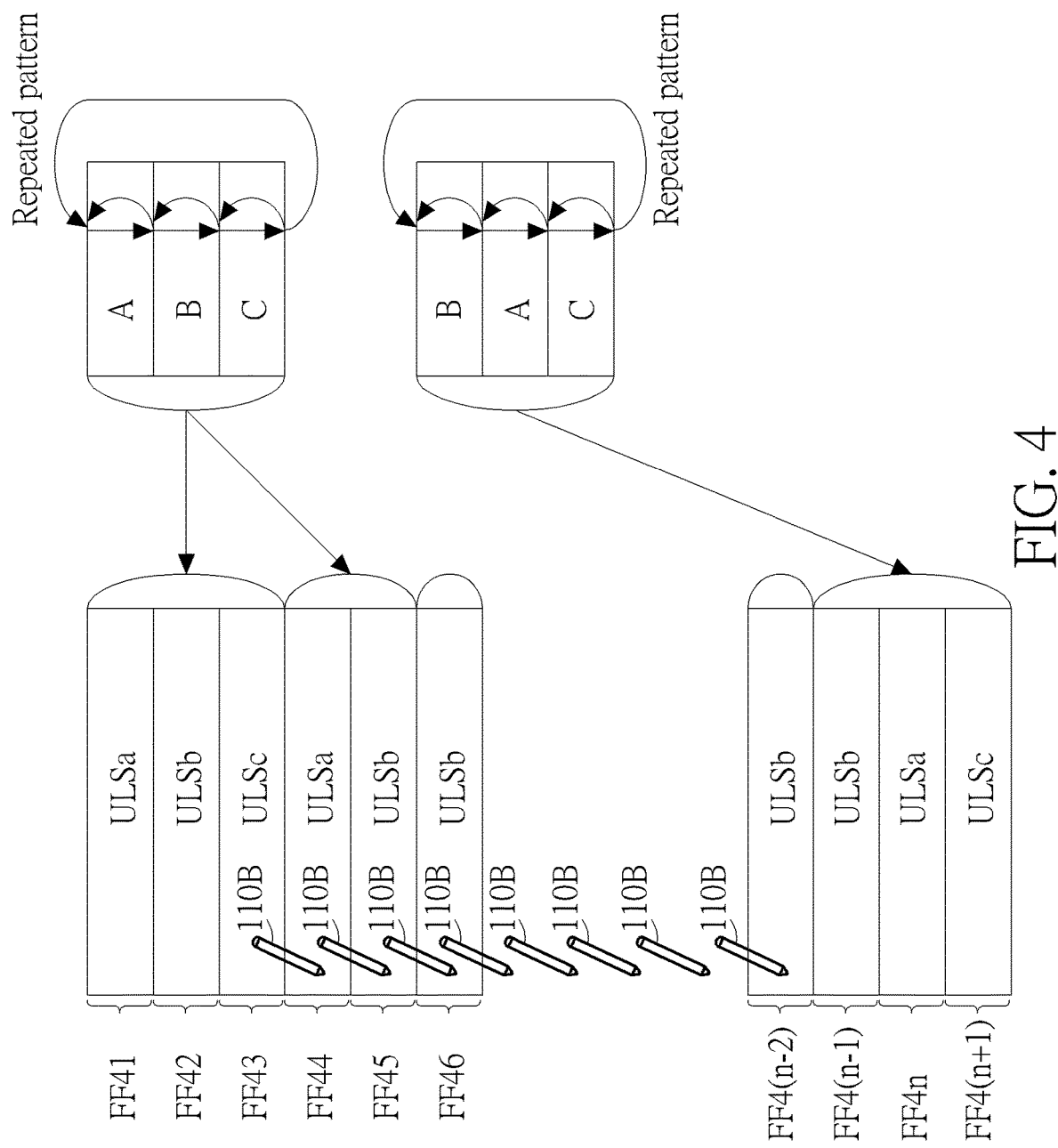
FIGS. 4 and 5 are schematic diagrams for a touch device when an active stylus moves into and out of the detection range of the touch device according to embodiments of the present invention.

To be more specific, please refer to FIG. 3 and FIG. 4. FIG. 3 is a sequence diagram for the touch device 130 when no active stylus touches/hovers over the touch device 130 according to an embodiment of the present invention. FIG. 4 is a sequence diagram for the touch device 130 when the active stylus 110B moves into and out of the detection range of the touch device 130 according to an embodiment of the present invention.

The touch device 130 may transmit different kinds of uplink signals, each conforming to one protocol different from another. For example, the touch device 130 alternately emits an uplink signal ULSa conforming to a (first) protocol A, an uplink signal ULSb conforming to a (second) protocol B, and an uplink signal ULSc conforming to a (third) protocol C when no active stylus moves into the detection range of the touch device 130. The touch device 130 may transmit the uplink signals ULSa to ULSc many times so as to notify any of the active stylus 110A (conforming to the protocol A), the active stylus 110B (conforming to the protocol B), and the active stylus 110C (conforming to the third protocol C) of the presence of the touch device 130.

In another aspect, the touch device 130 may cyclically detect the presence of the active styluses 110A to 110C using the uplink signals ULSa to ULSc in different frames FF31 to FF3$n$ based on a (first) repeat pattern (for instance, A→B→C), where n is an integer. The touch device 130 is able to find an active stylus when the active stylus touches/hovers over the touch device 130 and responds to the uplink signal, which conforms to the protocol corresponding to the active stylus, by transmitting a downlink signal to the touch device 130.

For example, in FIG. 4, the touch device 130 may provide the uplink signal ULSa, which conforms to the protocol A for the active stylus 110A, in a frame FF44. The active stylus 110B, which moves into the detection range of the touch device 130 at the frame FF44, is unable to accurately decode/demodulate the uplink signal ULSa. As a result, the active stylus 110B fails to transmit/generate any downlink signal to the touch device 130. The touch device 130 cannot find the active stylus 110B during the frame FF44.

During a frame FF45 of FIG. 4, the touch device 130 may provide the uplink signal ULSb, which conforms to the protocol B, for the active stylus 110B. After the active stylus 110B detects the uplink signal ULSb from the touch device 130 and determines that the uplink signal ULSb conforms to the protocol B, the active stylus 110B may transmit the downlink signal DLSb to the touch device 130 in the frame FF45. The touch device 130 thus finds the active stylus 110B during the frame FF45. Afterwards, the active stylus 110B may communicate with the touch device 130 (during frames FF46 to FF4($n$−3)). In other words, the active stylus 110B may (try to) connect to the touch device 130 only when the active stylus 110B receives the uplink signal ULSb, which can be accurately decoded by the active stylus 110B.

In a word, the active stylus 110B may be unable to correctly decode/demodulate the uplink signal ULSa accessible to the active stylus 110A or successfully connect to the touch device 130 in response to the inaccessible uplink signal ULSa. Since the active styluses conforming to different protocols are non-interchangeable, the touch device 130 may send uplink signals conforming to different protocols (separately and/or periodically) until the touch device 130 finds an active stylus.

In response to an active stylus moving into and/or out of the detection range of the touch device 130, a repeat pattern for detecting active styluses may be adjusted by (the driving circuit of) the touch device 130. As shown in FIG. 4, the detection of the active styluses 110A to 110C may follow one after another by means of the uplink signals ULSa to ULSc (recurrently) in frames FF41 to FF45 according to the (first) repeat pattern (namely, A→B→C) as FIG. 3 before/when the active stylus 110B is found by the touch device 130 at the frame FF45. After/when the touch device 130 detects the active stylus 110B at the frame FF45, the touch device 130 successively transmits the uplink signals ULSb in frames FF45 to FF4($n$−2) to perform the detection of the active stylus 110B having been detected. After the touch device 130 loses the connection to the active stylus 110B, the detecting the active styluses 110A to 110C may be switched from the (first) repeat pattern (namely, A→B→C) to another/second repeat pattern (for instance, B→A→C).

Specifically, as shown in FIG. 4, the active stylus 110B may leave the touch device 130 between frames FF4($n$−2) and FF4($n$−1). The touch device 130 may consecutively transmit the uplink signals ULSb in the frames FF45 to FF4($n$−2) until the touch device 130 fails to find/detect the active stylus 110B at the frame FF4($n$−2). After the touch device 130 finds the absence of the active stylus 110B at the frame FF4($n$−2), the touch device 130 may start detecting the active styluses 110A to 110C according to the new/second repeat pattern (namely, B→A→C) instead of the previous/first repeat pattern (namely, A→B→C) during frames FF4($n$−1) to FF4($n$+1). According to the new/second repeat pattern, the uplink signal ULSb is transmitted at the frame FF4($n$−1) (even) after the touch device 130 finds that the active stylus 110B has left.

After the active stylus 110B moves into and out of the detection range of the touch device 130 in FIG. 4, chances are that the active stylus 110B may approach the touch device 130 again. Basically, the active stylus 110B that has just left the touch device 130 has a high probability of being the first one to touch/hover over the touch device 130 later. With the new/second repeat pattern (namely, B→A→C), the touch device 130 may immediately detect the active stylus 110B of the highest priority in the new/second repeat pattern when the active stylus 110B returns to the detection range of the touch device 130. For example, if the active stylus 110B moves back to the touch device 130 at the frame FF4($n$−1), the active stylus 110B may receive the uplink signal ULSb and be detected by the touch device 130.

Therefore, a repeat pattern for detecting the active styluses 110A to 110C may be adjusted based at least in part on whether the active stylus 110A, 110B, or 110C has just moved in or out of the touch device 130. Because the active stylus 110B is newly detected by the touch device 130, the protocol B for the active stylus 110B may be ranked higher in the latest/second repeat pattern, such that the active stylus 110B may suffer less from latency. As the protocol B that the active stylus 110B conforms to takes priority over the protocols A and C in the latest/second repeat pattern (namely, B→A→C), the latency of the active stylus 110B may be minimized (for instance, to 0 frames). Generally, the less the latency is, the better the user experience would be. If the latency of the active stylus 110B is too long, the active stylus 110B may be unable to connect to the touch device 130.

The latency of the active stylus 110B may be related to the delay before the uplink signal ULSb is successfully received by the active stylus 110B (at a first time instant within the frame FF45) after the active stylus 110B moves into the detection range of the touch device 130 (at a second time instant within the frame FF44). The latency of the active stylus 110B may be defined as the delay before the downlink signal DLSb is transmitted from the active stylus 110B (at the frame FF45) after an uplink signal first transferred to the active stylus 110B (at the frame FF44). For example, regarding the previous/first repeat pattern A→B→C, the latency of the active stylus 110B may be counted as, for instance, 1 frame (because the active stylus 110B fails to decode the uplink signal ULSa transmitted first). Regarding the new/second repeat pattern B→A→C, the latency of the active stylus 110B may be counted as, for instance, 0 frames (because the active stylus 110B is able to decode the uplink signal ULSb transmitted first).

Since the touch device 130 first detects the active stylus 110B (instead of the active stylus 110A or 110C), the priority of the protocol B may increase and the relative order of the protocols A and C may be preserved in the new/second repeat pattern. In other words, as the protocol A comes before the protocol C in the previous/first repeat pattern (namely, A→B→C), the protocol A comes before the protocol C in the new/second repeat pattern (namely, B→A→C).

In a word, the active styluses 110A to 110C may conform to different protocols A to C, and the touch device 130 may send the uplink signals ULSa to ULSc, which conform to the protocols A to C respectively, one after another in a repeat pattern to search for all the active styluses 110A to 110C. After the touch device 130 detects an active stylus on itself, (the driving circuit of) the touch device 130 may replace one repeat pattern previously recorded with another repeat pattern to be recorded. The presence of the active stylus may increase the weighting of the protocol the active stylus conforms to, such that the touch device 130 may, for example, give higher priority to the active stylus or detect the active stylus more often. Accordingly, the latency of the active stylus may decrease.

A protocol (for instance, the protocol A, B, or C) may be configured to specify the time/timing for display operation, fingerprint recognition operation, finger touch operation, or active stylus operation. An uplink signal that satisfies the requirements of a protocol (for instance, the data format of the uplink signal, the transmission timing of the uplink signal (with respect to a frame), the uplink time length (such as the uplink time length Tu shown in FIG. 8), the frequency of the uplink signal, or a frame rate) is said to adopt/conform to that protocol. For example, an uplink signal is transmitted 100 microseconds after the start of a frame according to a protocol, while another uplink signal is transmitted 200 microseconds after the start of a frame according to another protocol. Therefore, the protocols of the two uplink signals are different. An active stylus conforming to a protocol means that the active stylus is able to receive an uplink signal conforming to the protocol or transmit a downlink signal conforming to the protocol. The information of the protocol(s) may be stored in the touch device 130 or the driving circuit of the touch device 130.

A frame (for instance, any of the frames FF31 to FF3$n$ or FF41 to FF4($n$+1)) may correspond to one of many still images which constitute a film. The frequency at which frame(s) is/are displayed may be called as a frame rate. The definition of a frame applies not only to the display operation but also to the fingerprint recognition operation, the finger touch operation, and the active stylus operation.

Figure 5:
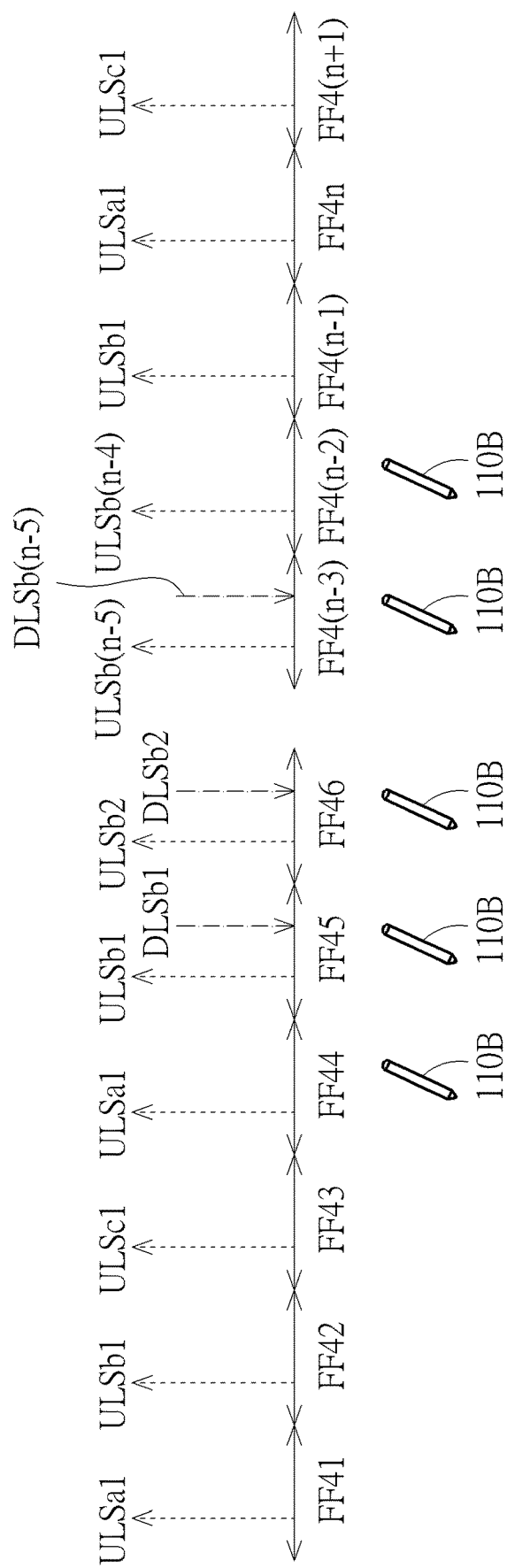

In an embodiment, FIG. 4 may be illustrated with more details in FIG. 5, which is a sequence diagram for the touch device 130 when the active stylus 110B moves into and out of the detection range of the touch device 130 according to an embodiment of the present invention.

In the frames FF45 to FF4($n$−1) shown in FIG. 5, the touch device 130 successively transmit uplink signals ULSb1 to ULSb($n$−4) conforming to the protocol B. The data of the uplink signals ULSb1 to ULSb($n$−4) of the frames FF45 to FF4($n$−1) may be the same or different. In response to the uplink signals ULSb1 to ULSb($n$−5) of the frames FF45 to FF4($n$−3), the active stylus 110B may reply with downlink signals DLSb1 to DLSb($n$−5) in the frames FF45 to FF4($n$−3). The data of the downlink signals DLSb1 to DLSb($n$−5) of the frames FF45 to FF4($n$−3) may be the same or different. In an embodiment, one of the downlink signals DLSb1 to DLSb($n$−5) of the frames FF45 to FF4($n$−3) may differ from another. Each of the downlink signals DLSb1 to DLSb($n$−5) (such as (operation) downlink signal S312$d$ shown in FIG. 9) may include information such as an on/off operation of a button of the active stylus 110B, how much charge the active stylus 110B has left, a stylus pressure, a stylus tone, a stylus tilt, a brush type, or stylus identification (ID) depending on an operation state of the active stylus 110B, but not limited thereto. In other words, the active stylus 110B may manipulate/control the display presented on the touch device 130 during at least one of the frames FF45 to FF4($n$−3).

As shown in FIG. 5, the active stylus 110B may approach the touch device 130 at the frame FF44 and leave the touch device 130 at the frame FF4($n$−2). In the frames FF41 to FF45 shown in FIG. 5, the touch device 130 may transmit the uplink signals ULSa1 to ULSc1 repeatedly according to the (first) repeat pattern. In the frames FF4($n$−1) to FF4($n$+1) shown in FIG. 5, the touch device 130 may transmit the uplink signals ULSa1 to ULSc1 repeatedly according to the (second) repeat pattern. In an embodiment, the uplink signals ULSa to ULSc shown in FIG. 4 may be used as (or the same as) the uplink signals ULSa1 to ULSc1 (or ULSb2 to ULSb($n$−4)) shown in FIG. 5 respectively.

Figure 6:
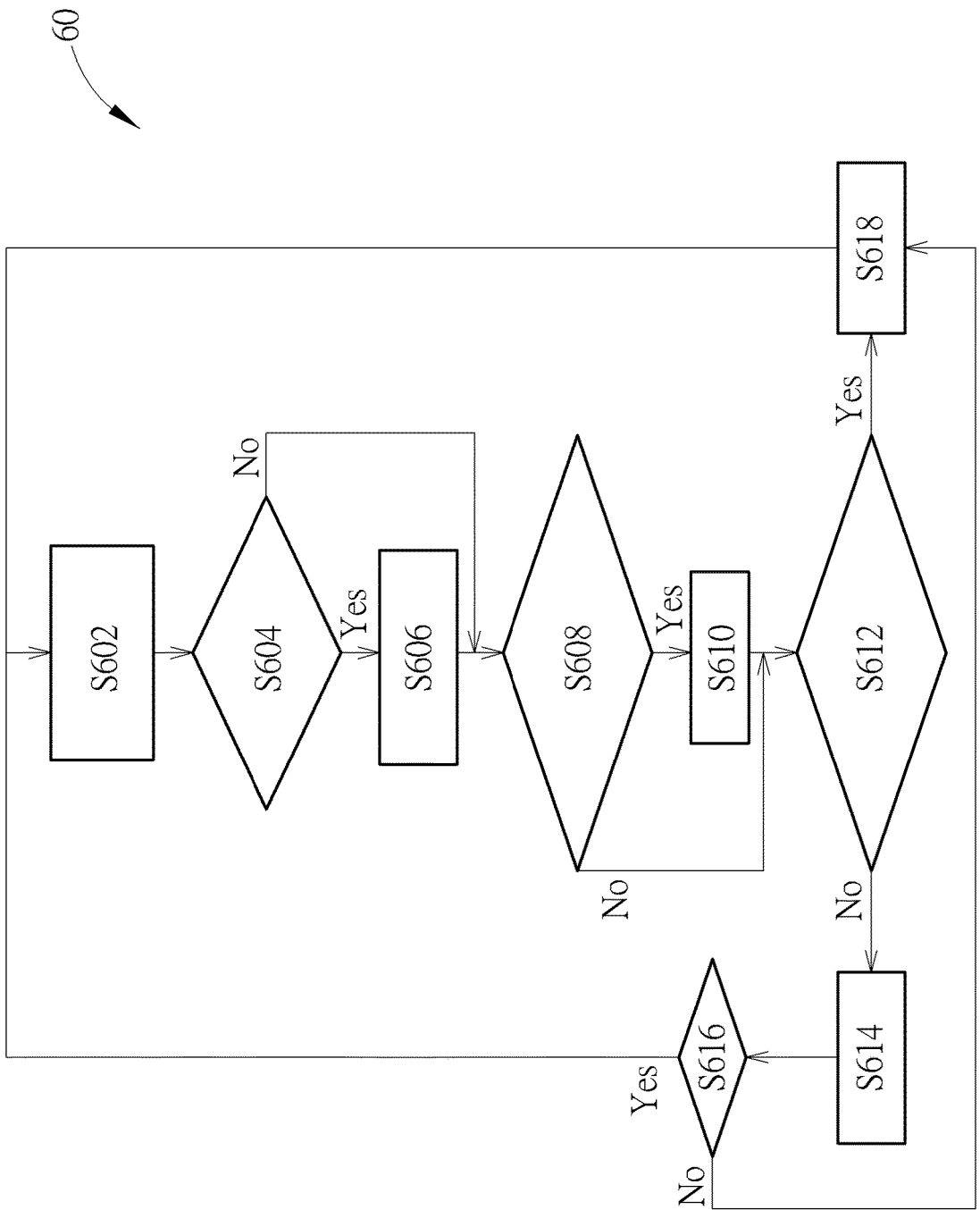
FIG. 6 is a flowchart of a weighting adjustment method according to an example of the present invention.

As set forth above, the weighting of the protocol A, B, or C may be changed after the touch device 130 finds the presence or the absence of an active stylus. FIG. 6 is a flowchart of a weighting adjustment method 60 according to an example of the present invention. A detection method including the weighting adjustment method 60 may be executed by (a digitizer of) the driving circuit of the touch device 130. The weighting adjustment method 60 may include steps as follows:

Step S602: Change the weightings of the protocols corresponding to active styluses except the active stylus having just moved in or out of the detection range of the touch device 130 with respect to the weighting of the protocol corresponding to the active stylus having just moved in or out of the detection range of the touch device 130.

Step S604: Determine whether any of the weightings of the protocols corresponding to active styluses except the active stylus having just moved in or out of the detection range of the touch device 130 is equal to or less than zero. If yes, go to Step S606; otherwise, go to Step S608.

Step S606: Convert any of the weightings of the protocols corresponding to active styluses except the active stylus having just moved in or out of the detection range of the touch device 130 from a negative number or zero into one.

Step S608: Determine whether the weighting of the protocol corresponding to the active stylus having just moved in or out of the detection range of the touch device 130 is less than a parameter plus the sum of the weightings of the protocols corresponding to active styluses except the active stylus having just moved in or out of the detection range of the touch device 130. If yes, go to Step S610; otherwise, go to Step S612.

Step S610: Change the weighting of the protocol corresponding to the active stylus having just moved in or out of the detection range of the touch device 130 with respect to the weightings of the protocols corresponding to active styluses except the active stylus having just moved in or out of the detection range of the touch device 130.

Step S612: Determine whether the weightings of the protocols are all equal. If yes, go to Step S618; otherwise, go to Step S614.

Step S614: Create a repeat pattern according to the weightings of the protocols.

Step S616: Determine whether an active stylus locates within the detection range of the touch device 130 a little time after Step S614. If yes, go to Step S602; otherwise, go to Step S618.

Step S618: Reset all the weightings of the protocols to one.

For example, if it is the active stylus 110B that has just moved in or out of the detection range of the touch device 130, a weighting W(A) of the protocol A and a weighting W(C) of the protocol C may be adjusted relatively in Step S602. In an embodiment, (the driving circuit of) the touch device 130 may subtract, for example, one from the weightings W(A) and W(C) of the protocols A and C but maintain a weighting W(B) of the protocol B, which the detected active stylus 110B conforms to. That is, the weightings W(A) and W(C) of the protocols A and C decrease (relative to the weighting W(B) of the protocol B). For example, as listed in Table 1, which shows how weightings W(A), W(B), and W(C) of the protocols A, B, and C changes if the active stylus 110B is the one detected by the touch device 130, weightings W(A), W(B), and W(C) of the protocols A, B and C may be converted from (3, 1, 3) to (2, 1, 2) respectively in Step S602 (because three minus one equals two). Alternatively, as listed in Table 2, which shows how weightings W(A) to W(C) of the protocols A to C changes if the active stylus 110B is the one detected by the touch device 130, the weightings W(A) to W(C) may be converted from (1, 3, 2) to (0, 3, 1) respectively in Step S602 (because one minus one equals zero and two minus one equals one).

than a parameter plus the sum of the weightings W(A) and W(C) of the protocols A and C. That is, (the driving circuit of) the touch device 130 may determine whether the inequation W(B)<W(A)+W(C)+S is satisfied, where S represents the parameter.

If the weighting W(B) is less than the parameter S plus the sum of the weightings W(A) and W(C), (the driving circuit of) the touch device 130 may add, for example, one to the weighting W(B) in Step S610. Accordingly, the weighting W(B) increases (relative to the weighting W(A) or W(C) of the protocol A or C). For example, as listed in Table 1, if the parameter S is set to 1, the weightings W(A) to W(C) may be converted from (3, 1, 3) to (2, 2, 2). In terms of the weightings W(A) and W(C), three minus one equals two. In terms of the weighting W(B), one plus one equals two.

If the weighting W(B) is equal to or greater than the parameter S plus the sum of the weightings W(A) and W(C), the weighting W(B) may remain unchanged. For example, as listed in Table 2, if the parameter S is set to 1, the weightings W(A) to W(C) may be converted from (1, 3, 2) to (1, 3, 1). In terms of the weighting W(A), one minus one plus one equals one. In terms of the weighting W(C), two minus one equals one. In terms of the weighting W(B), three plus one is greater than one plus the sum of one and one. Therefore, the weighting W(B) is unchanged (kept to three).

In light of the above rationales, Step S608 aims to impose a maximum limit on the weighting W(B) of the protocol B, which the detected active stylus 110B conforms to. Even if the active stylus 110B consecutively moves back and forth, in and out of the detection range of the touch device 130 over time, the weighting W(B) may not increase indefinitely. If another active stylus conforming to another protocol (for instance, the active stylus 110C conforming to the protocol C) suddenly approaches the touch device 130 and is detected

TABLE 1

|  | Previous | Step S602 | Step S604 | Step S606 | Step S608 | Step S610 | Step S612 | Step S614 | Step S616 | Step S618 |
|---|---|---|---|---|---|---|---|---|---|---|
| W(A) | 3 | 2 | 2 | — | 2 | 2 | 2 | — | — | 1 |
| W(B) | 1 | 1 | 1 | — | 1 | 2 | 2 | — | — | 1 |
| W(C) | 3 | 2 | 2 | — | 2 | 2 | 2 | — | — | 1 |

TABLE 2

|  | Previous | Step S602 | Step S604 | Step S606 | Step S608 | Step S610 | Step S612 | Step S614 | Step S616 | Step S618 |
|---|---|---|---|---|---|---|---|---|---|---|
| W(A) | 1 | 0 | 0 | 1 | 1 | — | 1 | 1 | 1 | 1 |
| W(B) | 3 | 3 | 3 | 3 | 3 | — | 3 | 3 | 3 | 1 |
| W(C) | 2 | 1 | 1 | 1 | 1 | — | 1 | 1 | 1 | 1 |

In Step S604, (the driving circuit of) the touch device 130 may determine whether the weighting W(A) or W(C) of the protocol A or C is equal to or less than zero in Step S604. If the weighting W(A) (or W(C)) is equal to or less than zero, (the driving circuit of) the touch device 130 may add, for example, one back to the weighting W(A) (or W(C)) in Step S606. Eventually, no weighting falls below one. In other words, one is the minimum value for the weighting of a protocol. And (the driving circuit of) the touch device 130 may assure the weightings W(A) to W(C) are not less than one. For example, as listed in Table 2, the weightings W(A) to W(C) may be converted from (1, 3, 2) to (1, 3, 1) (because one minus one plus one equals one and two minus one equals one).

In Step S608, (the driving circuit of) the touch device 130 may determine whether the weighting W(B) of the protocol B, which the detected active stylus 110B conforms to, is less by the touch device 130, the protocol C is able to have priority over the protocol B or rank higher relative to the protocol B to improve user experience.

In Step S612, (the driving circuit of) the touch device 130 may determine whether the weightings W(A) to W(C) are equal. That is, (the driving circuit of) the touch device 130 may determine whether the equation W(A)=W(B)=W(C) is satisfied.

If any of the weightings W(A) to W(C) is found unequal to another in Step S612, the sequence of the protocols A to C may be sorted to form a repeat pattern according to the weightings W(A) to W(C) in Step S614. If any of the weightings W(A) to W(C) in Step S612 is different from the corresponding weighting W(A), W(B), or W(C) previously recorded in the touch device 130 (before Step S602), the sequence of the protocols A to C may be reordered and changed from a previous/first repeat pattern previously recorded in the touch device 130 to a new/formed/second repeat pattern to be recorded in the touch device 130. The new/formed/second repeat pattern representing the sequence of the protocols A to C may be utilized to detect the presence of the active styluses 110A to 110C after Step S614. Specifically, the touch device 130 may start searching for the active styluses 110A to 110C according to the new/formed/second repeat pattern after the touch device 130 finds the absence of the active stylus 110B. For example, as listed in Table 2, the weightings W(A) to W(C) may be converted to (1, 3, 1) in Step S612. Since the weighting W(B) presented in Step S612 differs from the weightings W(A), W(C) and the weighting W(C) presented in Step S612 differs from the previous weighting W(C) provided before Step S602, the detection of the active styluses 110A to 110C is performed based on the new/formed/second repeat pattern corresponding to the weightings W(A) to W(C) presented in Step S612.

Later on, the touch device 130 may determine whether an active stylus is detected in Step S616. If the touch device 130 finds an active stylus according to the new/formed/second repeat pattern within a predetermined time in Step S616, (the driving circuit of) the touch device 130 may repeat the weighting adjustment method 60 from Step S602. If the touch device 130 fails to detect any active stylus according to the new/formed/second repeat pattern for a while in Step S616, all the weightings W(A) to W(C) may be reset to one respectively in Step S618. For example, as listed in Table 2, the weightings W(A) to W(C) may be converted to (1, 1, 1). Besides, the sequence of the protocols A to C may be converted from the new/formed/second repeat pattern to an initial repeat pattern (for instance, A→B→C) in Step S618. The initial repeat pattern may then be utilized to detect the presence of the active styluses 110A to 110C after Step S618.

If the weightings W(A) to W(C) are found equal in Step S612, all the weightings W(A) to W(C) may be reset to one respectively in Step S618. For example, as listed in Table 1, the weightings W(A) to W(C) may be converted to (1, 1, 1). Besides, the sequence of the protocols A to C may be converted from the new repeat pattern to an initial repeat pattern (for instance, A→B→C) in Step S618. The initial repeat pattern may then be utilized to detect the presence of the active styluses 110A to 110C after Step S618. If the touch device 130 finds an active stylus according to the initial repeat pattern after Step S618, (the driving circuit of) the touch device 130 may repeat the weighting adjustment method 60 from Step S602.

A repeat pattern may be organized at least according to the weightings. For example, Table 3 shows how a repeat pattern is adjusted according to change(s) in the weightings W(A) to W(C).

is not limited thereto. Since the weightings W(A) to W(C) are equal, the numbers of the protocols A to C in the repeat pattern A→B→C are the same.

The protocol of the highest weighting may be arranged first. When the weightings W(A) to W(C) are changed to (3, 1, 1), the repeat pattern in Table 3 may become A→B→A→C→A correspondingly. Because the weighting W(A) of the protocol A equals three, there may be three (protocols) "A" in the repeat pattern A→B→A→C→A. In other words, the number of a protocol appearing in a repeat pattern may be at least associated with (or a function of) the weighting of the protocol. If the touch device 130 cyclically detects the active styluses 110A to 110C in several frames according to a repeat pattern (without any active stylus found by the touch device 130), the ratio of the number of frames conforming to one certain protocol to the number of all the frames may be proportional to (or a function of) the weighting of the protocol. For instance, the active styluses 110A to 110C are periodically detected according to the repeat pattern A→B→A→C→A in ten continued frames, the ratio of the number of frames conforming to the protocol A (for instance, 6) to the number of all the frames (for instance, 10) may be 6:10, which is directly proportional to the weighting W(A) of the protocol A (for instance, 3).

The protocol(s) with lower weighting(s) (for instance, the protocol B with the weighting W(B) and the protocol C with the weighting W(C)) may be inserted into the array of the protocol of the highest weighting (for instance, the protocol A of the highest weighting W(A)) to form a repeat pattern. The relative order of the protocols B and C may depends on whether the weightings W(B) and W(C) are equal or unequal.

If the weightings W(B) and W(C) are equal, the protocols B and C may be arranged to make a new/second repeat pattern in an order similar to the previous/first repeat pattern. For example, when the weightings W(A) to W(C) are (3, 1, 1) listed in Table 3, the protocols B and C with the lower weightings W(B) and W(C) may be inserted between two adjacent (protocols) "A" of the highest weighting W(A) one by one to constitute the repeat pattern A→B→A→C→A. Specifically, the protocol B, which has the lowest weighting W(B), may be inserted before the first (protocol) "A" and the second (protocol) "A". The protocol C, which also has the lowest weighting W(C), may be inserted before the second (protocol) "A" and the last (protocol) "A". Since the repeat pattern is changed from A→B→A→C to A→B→A→C→A in Table 3, the protocol B remains before the protocol C, meaning that the relative ordering of the protocols B and C

TABLE 3

|  | Initial | Active Stylus 110A Moves In/Out | Active Stylus 110A Moves In/Out | Active Stylus 110A Moves In/Out | Active Stylus 110B Moves In/Out | Active Stylus 110B Moves In/Out | Active Stylus 110C Moves In/Out | Active Stylus 110A Moves In/Out |
|---|---|---|---|---|---|---|---|---|
| W(A) | 1 | 2 | 3 | 3 | 2 | 1 | 1 | 2 |
| W(B) | 1 | 1 | 1 | 1 | 2 | 3 | 2 | 1 |
| W(C) | 1 | 1 | 1 | 1 | 1 | 1 | 2 | 1 |
| Repeat pattern | A | A | A | A | B | B | C | A |
|  | B | B | B | B | A | A | B | B |
|  | C | A | A | A | C | B | A | A |
|  |  | C | C | C | B | C | C | C |
|  |  |  | A | A | A | B | B |  |

At first, the weightings W(A) to W(C) are set to (1, 1, 1) in Table 3. The repeat pattern may be A→B→C initially, but having the same weighting value is unchanged. In other words, the order of a protocol appearing in a repeat pattern may be at least associated with (or a function of) (firstly,) the weighting of the protocol (and secondly, the previous repeat pattern A→B→A→C).

If the weightings W(B) and W(C) are unequal, the protocol having higher weighting may be placed before the protocol having lower weighting. For example, when the weightings W(A) to W(C) are (3, 2, 1), the protocol B with the higher weighting W(B) may be located before the protocol C with the lower weighting W(C) to create the repeat pattern A→B→A→C→A. If the previous/first repeat pattern is A→C→A→B, then the previous/first repeat pattern is changed from A→C→A→B to form the new/second repeat pattern A→B→A→C→A. The relative ordering of the protocols B and C may be unchanged, if, in the previous/first repeat pattern, the protocol C of the lower weighting W(C) for the new/second repeat pattern comes after the protocol B of the higher weighting W(B) for the new/second repeat pattern. In other words, the order of a protocol appearing in a repeat pattern may be at least associated with (or a function of) the weighting of the protocol.

If at least two of the protocols have the highest weighting, the relative order of the protocols may be based at least in part on which of the protocols corresponds to the active stylus that has just moved in/out of the touch device 130.

For example, after the touch device 130 finds that the active stylus 110A has left and the active stylus 110B comes into the detection range of the touch device 130, the weightings W(A) to W(C) may be converted from (3, 1, 1) to (2, 2, 1) in Table 3. When the weightings W(A) to W(C) are (2, 2, 1), the repeat pattern in Table 3 may be B→A→C→B→A correspondingly. Because both the weightings W(A) and W(B) of the protocols A and B equal two, there may be two (protocols) "A" and two (protocols) "B" in the repeat pattern B→A→C→B→A. Since it is the active stylus 110B conforming to the protocol B that currently touches/hovers over the touch device 130, the two (protocols) "B" are arranged first in the repeat pattern. Then, the protocol A with the weighting W(A) may be inserted into the array of the protocol B of the weighting W(B), which is equal to the weighting W(A). Specifically, one of the two (protocols) "A" may be inserted between two adjacent (protocols) "B"; the other one of the two (protocols) "A" may be inserted behind the last (protocol) "B". In other words, the order of a protocol appearing in a repeat pattern may be associated with (or a function of) (firstly, the weighting of the protocol and secondly,) whether the corresponding active stylus currently detected by the touch device 130.

When at least two of the protocols have the highest weighting, the protocol(s) with lower weighting(s) (for instance, the protocol C with the weighting W(C)) may be inserted into the array of the protocols of the highest weighting (for instance, the protocol A of the highest weighting W(A) and the protocol B with the weighting W(B)). In an embodiment, the protocols of the highest weighting may constitute a set (for instance, B→A) to be repeated (many times) in order to form the array (for instance, B→A, B→A).

When the weightings W(A) to W(C) are, for example, (2, 2, 1) listed in Table 3, the protocol C, which has the lowest weighting W(C), may be inserted after the first (protocol) "A" and the first (protocol) "B" and before the last (protocol) "A" and the last (protocol) "B". Eventually, the repeat pattern is changed from A→B→A→C→A to B→A→C→B→A.

In a word, the number of a protocol appearing in a repeat pattern may be at least associated with the weighting of the protocol. Besides, in a time interval without finding any active stylus, the ratio of the number of uplink signals conforming to one certain protocol (for instance, the uplink signals ULSb conforming to the protocol B) to the number of all the uplink signals ULSa to ULSc transmitted by the touch device 130 may be at least associated with which of the active styluses 110A to 110C has just left the touch device 130. The order of transmitting the uplink signals ULSa to ULSc according to the new/second repeat pattern may be at least associated with the weightings of the protocols A to C, the previous/first repeat pattern for transmitting the uplink signals ULSa to ULSc, or which of the active styluses 110A to 110C has just left the touch device 130.

The exact value of the parameter S should be properly selected because it has an influence on user experience. The parameter S may be pre-determined by (the digitizer of) the driving circuit of the touch device 130. The larger the parameter S is, the higher the maximum limit on the weighting of a protocol for a detected active stylus can be. In other words, the active stylus (for instance, the active stylus 110B) that has just left the touch device 130 (many times) may be discovered by the touch device 130 faster or searched by the touch device 130 more frequently in the near future as the parameter S increases. However, if the parameter S is too large, the touch device 130 may not react efficiently/immediately when another active stylus (for instance, the active stylus 110C) suddenly approaches the touch device 130 after the active stylus having just left the touch device 130 (for instance, the active stylus 110B). User experience may thus become poor.

For example, Table 3 also shows how the weightings W(A) to W(C) changes when one of the active styluses 110A to 110C is detected by the touch device 130, supposing the parameter S is set to 1. Additionally, Table 4 shows how the weightings W(A) to W(C) changes when one of the active styluses 110A to 110C is detected by the touch device 130 with the parameter S set to −1. The repeat patterns in Table 3 and Table 4 may differ as the parameter S varies, even though the initial weightings and the initial repeat pattern in Table 3 is the same as the initial weightings and the initial repeat pattern in Table 4 in the first place. Since the parameter S for Table 3 (namely, 1) is larger than the parameter S for Table 4 (namely, −1), the maximum weighting of a protocol shown in Table 3 (for example, W(A)=3) is larger than the maximum weighting of a protocol for Table 4 (for example, W(A)=1).

TABLE 4

|  | Initial | Active Stylus 110A Moves In/Out | Active Stylus 110A Moves In/Out | Active Stylus 110A Moves In/Out | Active Stylus 110B Moves In/Out | Active Stylus 110B Moves In/Out | Active Stylus 110C Moves In/Out | Active Stylus 110A Moves In/Out |
|---|---|---|---|---|---|---|---|---|
| W(A) | 1 | 1 | 1 | 1 | 1 | 1 | 1 | 1 |
| W(B) | 1 | 1 | 1 | 1 | 1 | 1 | 1 | 1 |

TABLE 4-continued

|  | Initial | Active Stylus 110A Moves In/Out | Active Stylus 110A Moves In/Out | Active Stylus 110A Moves In/Out | Active Stylus 110B Moves In/Out | Active Stylus 110B Moves In/Out | Active Stylus 110C Moves In/Out | Active Stylus 110A Moves In/Out |
|---|---|---|---|---|---|---|---|---|
| W(C) | 1 | 1 | 1 | 1 | 1 | 1 | 1 | 1 |
| Frame | A | A | A | A | B | B | C | A |
| Schedule | B | B | B | B | A | A | B | C |
| Unit | C | C | C | C | C | C | A | B |

A repeat pattern may be represented in different ways. When there is no active stylus within the detection range of the touch device 130, the touch device 130 may keep detecting the active styluses 110A to 110C according to a repeat pattern (for example, B→A→C→B→A). The repeat pattern B→A→C→B→A may be repeated several times to present B→A→C→B→A→B→A→C→B→A. In a variant embodiment, the repeat pattern B→A→C→B→A may be implemented by a repeat pattern A→B→A→C→B, a repeat pattern B→A→B→A→C, a repeat pattern C→B→A→B→A, or a repeat pattern A→C→B→A→B, but is not limited thereto.

A repeat pattern for detecting the active styluses 110A to 110C may be recorded/stored in the touch device 130 or the driving circuit of the touch device 130. The active stylus 110A, 110B, or 110C may be a stylus of active capacitive type, but is not limited thereto. The touch device 130 may a mobile phone, a tablet, or laptop, but is not limited thereto. There may be many active styluses (for instance, the active styluses 110A) touching/hovering over one touch device 130 at a time if the active styluses conform to the same protocol (for instance, the protocol A), which supports multi-pen protocol.

Figure 7:
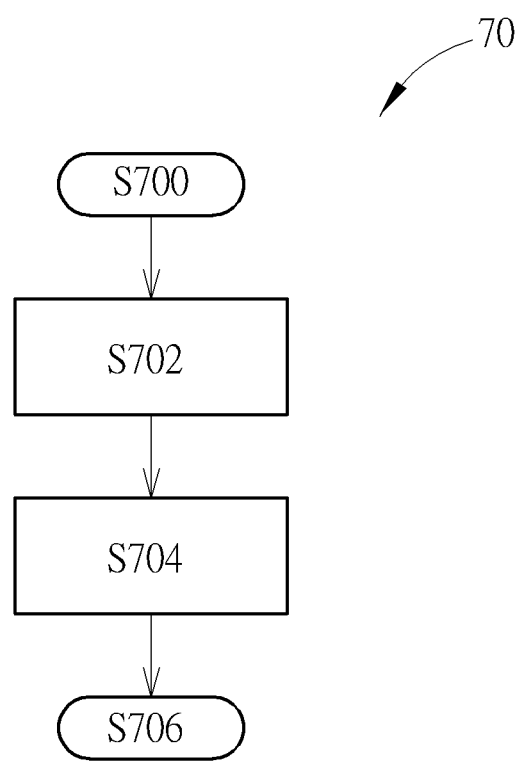
FIG. 7 is a flowchart of a detection method according to an example of the present invention.

FIG. 7 is a flowchart of a detection method 70 according to an example of the present invention. The detection method 70 may be instructed by the driving circuit of the touch device 130 or executed by the touch device 130. The detection method 70 may include steps as follows:

Step S700: Start.

Step S702: Transmit an uplink signal ULSa conforming to the protocol A of the active stylus 110A.

Step S704: Transmit an uplink signal ULSb conforming to the protocol B of the active stylus 110B.

Step S706: End.

Figure 8:
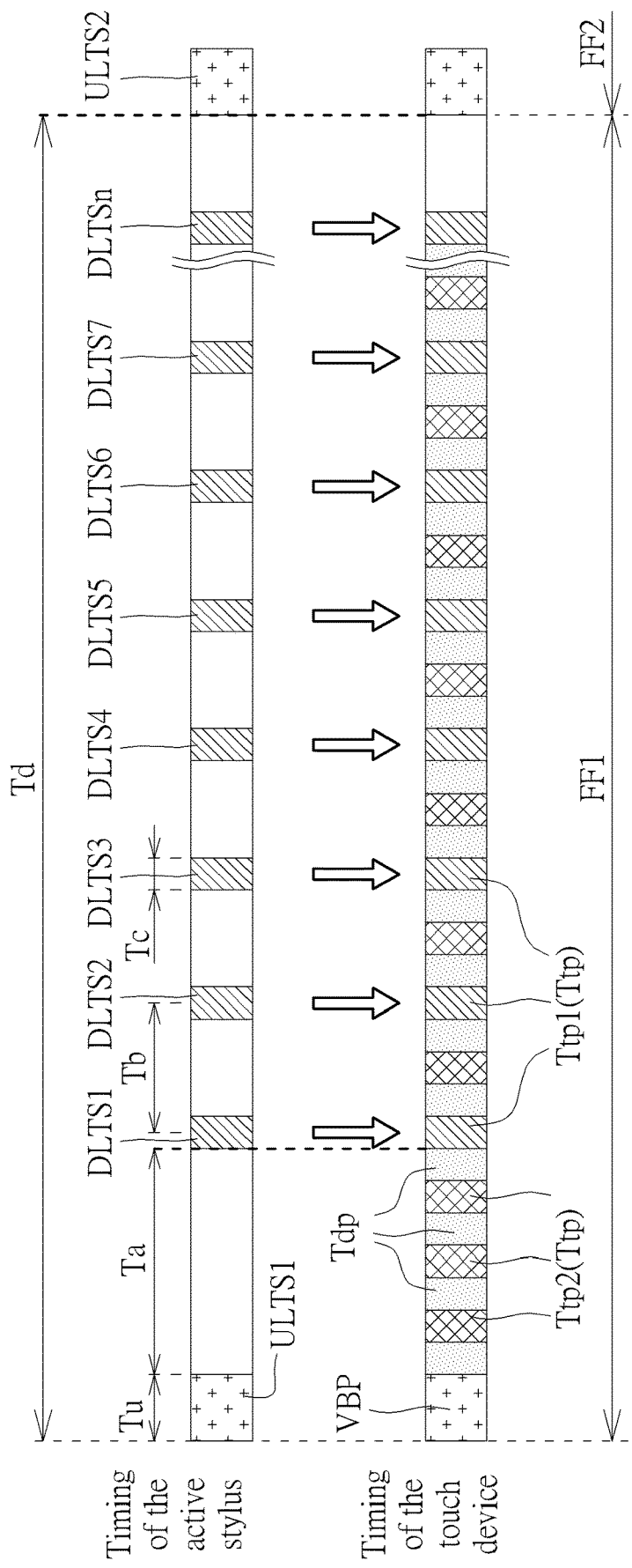
FIG. 8 is a timing chart of an active stylus and a touch device according to an embodiment of the present invention.

FIG. 8 is a timing chart of an active stylus (such as the active stylus 110A, 110B, or 110C) and the touch device 130 according to an embodiment of the present invention.

One frame FF1 for the touch device 130 may be divided into a porch VBP, display period(s) Tdp, and touch period(s) Ttp. The start (or the end) of one frame may be defined according to a vertical sync signal; the display period(s) Tdp and touch period(s) Ttp may be defined according to a horizontal sync signal.

According to timing requirements/configuration, the touch device 130 may perform display operation to display images during display period(s) Tdp, and may perform touch operation to sense a touch input induced by a finger during a touch period Ttp (for instance, the touch period Ttp2) and/or a touch input induced by the active stylus 110A (or 110B) during a touch period Ttp (for instance, the touch period Ttp1). In other words, a protocol involves timing requirements/configuration shown in FIG. 8.

As shown in FIG. 8, timing parameter(s) of the active stylus 110A (or 110B) may include an uplink time length Tu, an uplink period Td, an uplink-falling-edge-to-downlink-rising-edge time length Ta, a downlink period Tb, a downlink time length Tc, or a downlink slot number n. The timing parameter(s) (and thus the protocol A) of the active stylus 110A may be different from the timing parameter(s) (and thus the protocol B) of the active stylus 110B.

The timing parameter(s) of the active stylus 110A or 110B (and thus the transmission timing of the downlink signal DLSa or DLSb) may be adjusted/configured/calibrated to meet the timing requirements/configuration of the touch device 130, such that, for example, the touch device 130 is able to receive the downlink signal DLSa from the active stylus 110A in time. In other words, if the downlink signal DLSa is transmitted from the active stylus 110A to the touch device 130 at the right time, touch operation of the touch device 130 may not interfere with display operation of the touch device 130, and the touch device 130 may receive the downlink signal DLSa accurately/completely.

The downlink time length Tc may be the length of time for a downlink timeslot DLTS1, DLTS2 . . . or DLTSn, where n is an integer. The active stylus 110A (or 110B) may transmit the downlink signal DLSa shown in FIG. 1 (or the downlink signal DLSb shown in FIG. 2) to the touch device 130 in the downlink timeslot(s) DLTS1, DLTS2 . . . and/or DLTSn. One touch period Ttp may be equal to or longer than one downlink time length Tc. The downlink time length Tc (and thus the transmission timing for the downlink timeslot(s) DLTS1, DLTS2 . . . or DLTSn) may be adjusted/configured so that each of the downlink timeslots DLTS1 to DLTSn may coincide with one touch period Ttp1. Alternatively, the touch device 130 may adjust/configure the start of the touch operation within one touch period Ttp1. In this manner, the touch device 130 is able to receive the downlink signal DLSa from the active stylus 110A in time (or properly) and/or decode the downlink signal DLSa correctly.

The uplink-falling-edge-to-downlink-rising-edge time length Ta may start from the end of the uplink timeslot ULTS1 and end at the start of the downlink timeslot DLTS1 (coming after the uplink timeslot ULTS1). The uplink-falling-edge-to-downlink-rising-edge time length Ta (and thus the transmission timing for the downlink timeslot DLTS1) may be adjusted/configured so that the downlink timeslot DLTS1 may overlap/coincide with one touch period Ttp1.

The downlink period Tb may be the time length between two adjacent downlink timeslots (for instance, from the start of the downlink timeslot DLTS1 to the start of DLTS2). The downlink period Tb (and thus the transmission timing for the downlink timeslots DLTS2 to DLTSn) may be adjusted/configured so that each of the downlink timeslots DLTS1 to DLTSn may overlap/coincide with one touch period Ttp1.

The downlink slot number n may be the total number of the downlink timeslots DLTS1 to DLTSn. In FIG. 8, the downlink slot number n may be equal to 8.

The uplink time length Tu may be the length of time for an uplink timeslot ULTS1 or ULTS2. The touch device 130 may transmit the uplink signal ULSa shown in FIG. 1 to the active stylus 110A in the uplink timeslot ULTS1 or ULTS2. The uplink timeslot ULTS1 may overlap/coincide with the porch VBP of the frame FF1 for the touch device 130.

The uplink period Td may be the time length between the two adjacent uplink timeslots ULTS1 and ULTS2. The uplink period Td may be equal to the time length of the frame FF1 for the touch device 130 or the reciprocal of the frame rate of the touch device 130. In an embodiment, the touch device 130 may indicate (to the active stylus 110A or 110B) that the frame rate is 60 hertz (Hz), while the exact frame rate of the touch device 130 may be (slightly) higher/lower than 60 Hz, and hence the uplink period Td is requested to be (slightly) shorter/longer than 16.667 milliseconds (ms). Accordingly, there is a need to make timing calibration (automatically) after the timing parameter(s) of the active stylus 110A or 110B for the touch device 130 has/have been (automatically) configured. In other words, the uplink period Td (or the transmission timing for the downlink timeslot(s) in a frame FF2) may be adjusted/configured such that each downlink timeslot (for instance, each of the downlink timeslots DLTS1 to DLTSn) may overlap/coincide with one touch period Ttp1.

Figure 9:
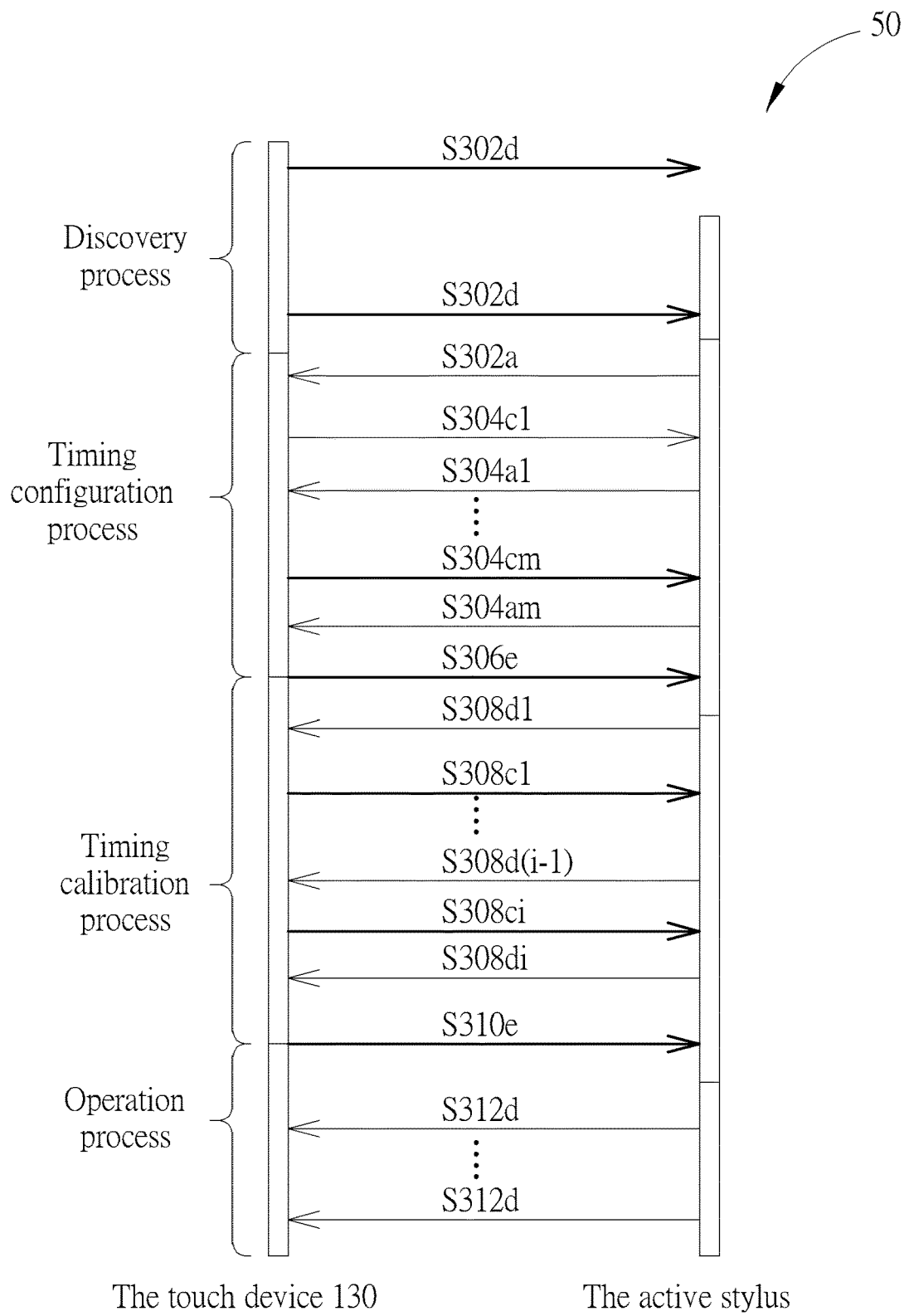
FIG. 9 is a sequence diagram of a synchronization method according to an embodiment of the present invention.

FIG. 9 is a sequence diagram of a synchronization method 50 according to an embodiment of the present invention.

The touch device 130 may notify an active stylus (such as the active stylus 110A, 110B, or 110C) of the presence of the touch device 130. Specifically, the touch device 130 may transmit a detect signal S302d, which may serve as the uplink signal ULSa or ULSb, many times. The detect signal S302d may include a command to instruct the active stylus to enter a discovery process, and/or identification information of the touch device 130. After the active stylus detects the (last) detect signal S302d, the active stylus may respond with a response signal S302a, which may be an acknowledgement (ACK).

The touch device 130 may determine that the active stylus touches/hovers over the touch device 130 (in Step S901) and initiate a timing configuration process after the touch device 130 receives the response signal S302a.

In one embodiment, the touch device 130 may send the timing configuration signals S304c1 to S304cm, which may serve as the uplink signal ULSa (or ULSb) respectively, to indicate (preliminary/uncalibrated) timing parameter(s) for the touch device 130 in the timing configuration process (in Step S904), where m is an integer. Specifically, the touch device 130 may split a timing configuration data into timing configuration signals S304c1 to S304cm (for instance, according to bandwidth of uplink transmission). Each of the timing configuration signals S304c1 to S304cm may carry a smaller number of bits of information, while the timing parameter(s) may be represented by a larger number of bits. Consequently, each of the timing configuration signals S304c1 to S304cm may specify a portion of the timing parameter(s): for example, the timing configuration signals S304c1 may include information of the downlink time length Tc, and the timing configuration signals S304c2 may include information of the uplink period Td. The active stylus may receive the timing configuration signals S304c1 to S304cm one by one to integrate all of the timing configuration signals S304c1 to S304cm back into the timing configuration data corresponding to all the timing parameter(s). In another embodiment, the touch device 130 may send merely one timing configuration signal (corresponding to the timing configuration data) to indicate all the timing parameter(s) for the touch device 130 in the timing configuration process (in Step S904) (if the bandwidth is high enough or the amount of the timing configuration data is relatively small). Therefore, the active stylus may receive the timing configuration data at a time.

After the active stylus receives any of the timing configuration signals S304c1 to S304cm, the active stylus may respond with an acknowledgement (namely, one of acknowledgements S304a1 to S304am). The active stylus may transmit one of the acknowledgements S304a1 to S304am (or the response signal S302a) at a time point designated by the corresponding timing configuration signal (or the detect signal S302d). The time point may be designated by using a command in the corresponding timing configuration signal (or the detect signal S302d). Alternatively, the active stylus may send one of the acknowledgements S304a1 to S304am (or the response signal S302a) for a long time. Once the touch device 130 has detected a signal, the touch device 130 regards the signal as the acknowledgement (or the response signal S302a).

After the active stylus receives all the timing parameter(s) (or more specifically, the touch device 130 receives the last acknowledgement S304am), the touch device 130 may determine that all the timing parameter(s) is/are transmitted to the active stylus (in Step S905) and send a timing configuration end signal S306e, which may serve as the uplink signal ULSa (or ULSb), to the touch device 130 to finish the timing configuration process (or a timing pairing mode/state).

The system 10 starts a timing calibration process to calibrate a (calibration) downlink signal against the touch periods of the touch device 130 such that one (calibration) downlink timeslot (for instance, any of calibration downlink timeslots detailed below or the downlink timeslots DLTS1 to DLTSn shown in FIG. 8) eventually overlaps/coincides with one touch period (for instance, the corresponding touch period Ttp1 shown in FIG. 8). In other word, one active stylus (for instance, the active stylus 110A) and one touch device (for instance, the touch device 130) are paired on a case-by-case approach. The timing of one active stylus may be optimized according to the timing of one touch device to be paired with.

The active stylus may transmit calibration downlink signals S308d1 to S308di (or merely one calibration downlink signal if it is enough), which may serve as the downlink signal DLSa (or DLSb) respectively, to the touch device 130, where i is an integer.

After the touch device 130 receives the calibration downlink signal S308d1 (in Step S906), the touch device 130 may determine whether the calibration downlink timeslots of the calibration downlink signal S308d1 coincides/coincide with touch periods Ttp1 of the touch device 130. In one embodiment, the touch device 130 may decode the calibration downlink signal S308d1 to generate a decoding result. The touch device 130 may check whether the (transmission) timing of the calibration downlink signal S308d1 is calibrated according to the correctness of the decoding result of the calibration downlink signal S308d1 and/or the signal strength of the carrier of the calibration downlink signal S308d1. For example, the touch device 130 may measure the waveform of the downlink signal S308d1, and determine, for instance, whether each of the calibtration downlink timeslots of the calibration downlink signal S308d1 overlaps/coincides with one touch period Ttp1.

If the (transmission) timing of the calibration downlink signal S308d1 has not been calibrated yet (for instance, at least one of the calibration downlink timeslots of the calibration downlink signal S308d1 is shifted away from the corresponding touch period(s) Ttp1 of the touch device 130), the touch device 130 may transmit a timing checking-and-adjusting signal S308c1, which may serve as the uplink signal ULSa (or ULSb), (in Step S908) to instruct the active stylus to shift/adjust at least one of the calibration downlink timeslots of the calibration downlink signal S308d2 to be transmitted. For example, the active stylus may shift the calibration downlink timeslot of the calibration downlink signal S308d1 so as to make all the calibration downlink timeslots of the calibration downlink signal S308di eventually overlap/coincide with the corresponding touch periods Ttp1. Alternatively, the active stylus may adjust the (current) timing parameter(s) of the active stylus (for example, decrease/increase the downlink time length, the uplink-falling-edge-to-downlink-rising-edge time length, the downlink period, or the uplink period of the calibration downlink signal S308d1) so as to make all the calibration downlink timeslots of the calibration downlink signal S308di eventually overlap/coincide with the corresponding touch periods Ttp1.

In response to the timing checking-and-adjusting signal S308c1, the active stylus may then transmit the calibration downlink signal S308d2 to the touch device 130. After the touch device 130 receives the calibration downlink signal S308d2 (in Step S906), the touch device 130 may go through steps (Step S907, S908) again to check other calibration downlink signal(s) and/or transmit other timing checking-and-adjusting signal(s). In fact, the (transmission) timing of the active stylus may be adjusted repeatedly/iteratively until the calibration downlink signal S308di having all its calibration downlink timeslots 1DLTS1 to 1DLTSn coinciding with the touch periods Ttp1.

After the touch device 130 determines that calibration downlink timeslots of the last calibration downlink signal S308di, which is transmitted according to the (calibrated/optimum) timing parameter(s), coincide with touch periods Ttp1 of the touch device 130 (in Step S907), the touch device 130 may transmit a timing calibration end signal S310e, which may serve as the uplink signal ULSa (or ULSb), to the active stylus to finish the timing calibration process.

After the timing calibration process is completed, the active stylus may enter/return to an operation process (in Step S910). Specifically, the active stylus may transmit (operation) downlink signal(s) S312d, which may serve as the downlink signal DLSa (or DLSb), according to the (calibrated/optimum) timing parameter(s) of the active stylus for the touch device 130 (in Step S910). The downlink timeslot(s) (for instance, the downlink timeslots DLTS1 to DLTSn shown in FIG. 8) of the downlink signal(s) S312d coincide with the touch period(s) (for instance, the touch periods Ttp1 shown in FIG. 8) of the touch device 130. In the operation process, a user may use the active stylus to write, mark up, and draw.

Figure 10:
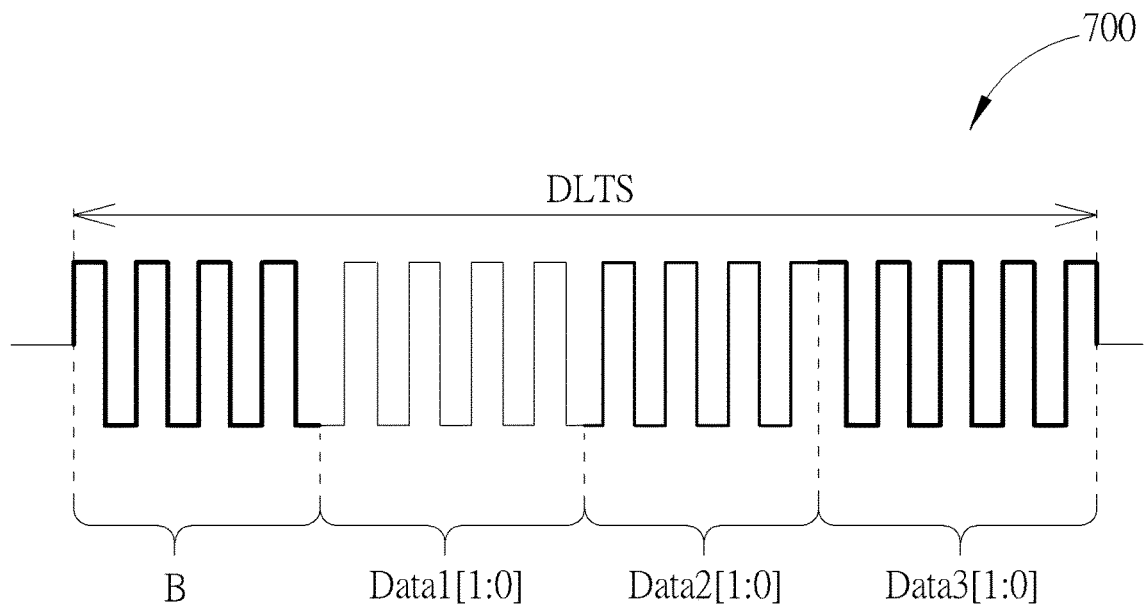
FIG. 10 is a downlink modulation format of a data signal according to an embodiment of the present invention.

FIG. 10 is a downlink modulation format of a data signal 700 according to an embodiment of the present invention. A downlink signal (for instance, one of the calibration downlink signals S308d1 to S308di in FIG. 9, the downlink signal DLSa, or DLSb) may include the data signal 700, which is scheduled to be transmitted in one downlink timeslot DLTS (for instance, any of the downlink timeslot DLTS1 to DLTSn in FIG. 8). As shown in FIG. 10, the data signal 700 may be modulated by DQPSK (Differential Quadrature Phase Shift Keying), but is not limited thereto. The data signal 700 may be demodulated by DQPSK to include a base symbol B and three symbols Data1[1:0], Data2[1:0], and/or Data3[1:0], each representing 2-bit data. Each 2-bit data may be expressed by a quadrature phase shift from the base symbol B. The symbols Data1[1:0], Data2[1:0], and/or Data3[1:0] may be "10", "00", and "01" in binary, and cause phase shifts of 90, 180, and 270 degrees respectively.

The data signal 700 may play a role on the timing calibration process (in Step S907). If the (transmission) timing of an active stylus (such as the active stylus 110A, 110B, or 110C) for the touch device 130 is calibrated (so that, for example, each of the calibration downlink timeslots of the calibration downlink signal S308di overlaps/coincides with one touch period Ttp1), the data signal 700 may be demodulated/decoded correctly by the touch device 130. Whether the (transmission) timing of the active stylus is calibrated to meet the timing requirements/configuration of the touch device 130 may be determined by examining/determining whether the data signal 700 after demodulation is correct or not.

To achieve timing calibration (in Step S907), the touch device 130 may analyze the data signal 700 to extract raw-data related to the signal strength of the carrier of the data signal 700 (or the corresponding calibration downlink signal). If the (transmission) timing of the active stylus for the touch device 130 is calibrated (so that, for example, each of the calibration downlink timeslots of the calibration downlink signal S308di overlaps/coincides with one touch period Ttp1), the raw-data may be demodulated correctly by the touch device 130. Whether the (transmission) timing of the active stylus is calibrated to meet the timing requirements/configuration of the touch device 130 may be determined by examining/determining whether the raw-data after demodulation is qualified or not.

Figure 11:
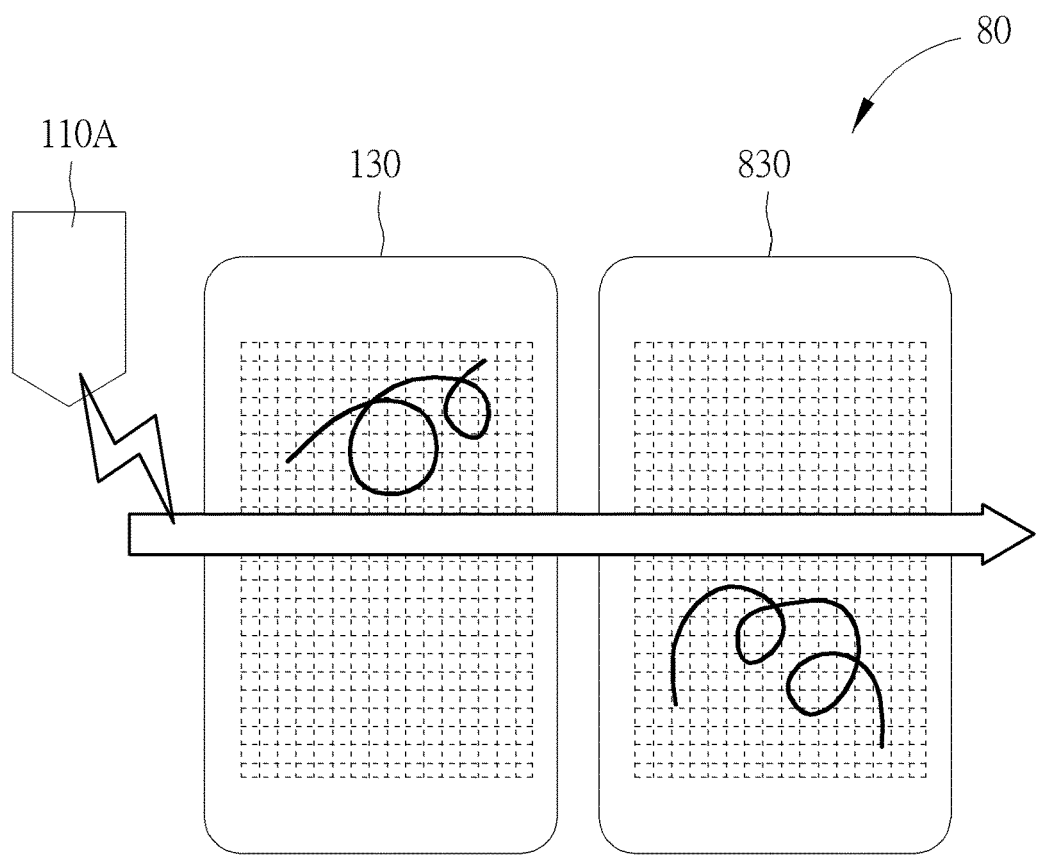
FIG. 11 is a schematic diagram of a cross-platform system according to an embodiment of the present invention.

FIG. 11 is a schematic diagram of a cross-platform system 80 according to an embodiment of the present invention. As shown in FIG. 11, an active stylus (such as the active stylus 110A, 110B, or 110C) may move from one touch device (for instance, the touch device 130) to another touch device (for instance, a touch device 830). The (calibrated/optimum) transmission timing for the touch device 130 may be different from the (calibrated/optimum) transmission timing for the touch device 830. For example, the active stylus 110A may transmit (operation) downlink signal(s) in the operation process to the touch device 130 according to the (calibrated/optimum) timing parameter(s) for the touch device 130 and transmit (operation) downlink signal(s) in the operation process to the touch device 830 according to the (calibrated/optimum) timing parameter(s) for the touch device 830. In other words, the active stylus 110A is able to communicate to different touch devices and may communicate to different touch devices alternately.

The (transmission) timing for the touch device 130 (such as the calibrated/optimum timing parameter(s) of the active stylus 110A for the touch device 130) may be stored in a timing table 130T (after a timing calibration process such as Step S907); the (transmission) timing for the touch device 830 (such as the calibrated/optimum timing parameter(s) of the active stylus 110A for the touch device 830) may be stored in a timing table 830T (after another timing calibration process such as Step S907). In an embodiment, timing table(s) (for example, the timing tables 130T and 830T) may be stored in the active stylus 110A. In this case, the active stylus 110A may instruct/trigger (a controller of) a touch device (for example, the touch device 130 or 830) to send an uplink signal, which is configured to indicate which timing table the active stylus 110A should select, to the active stylus 110A after the active stylus 110A touches/hovers over the touch device and is to be operated in the operation process.

In another embodiment, timing table(s) (for example, the timing tables 130T and 830T) may be stored in the touch device 130 or 830 (for instance, a microcontroller (MCU) or a controller of a touch-and-display-driver-integrated-circuit (TDDI) of the touch device 130). In this case, the touch device 130 (or 830) may send an uplink signal, which is configured to indicate the (transmission) timing of the active stylus 110A for the touch device 130 (or 830), to the active stylus 110A after the active stylus 110A touches/hovers over the touch device 130 (or 830) and is to be operated in the operation process.

Figure 12:
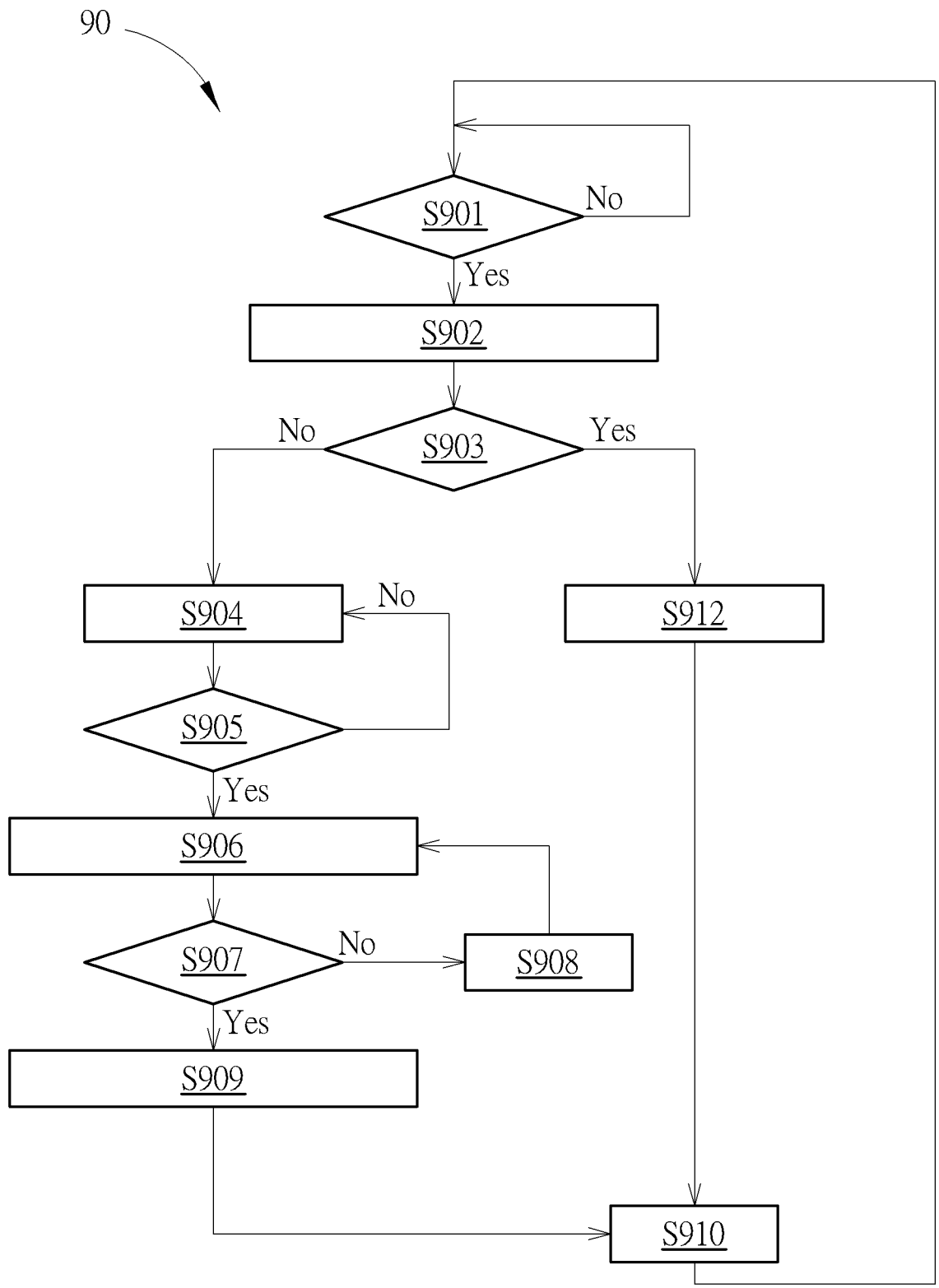
FIG. 12 is a flowchart of a synchronization method according to an embodiment of the present invention.

FIG. 12 is a flowchart of a synchronization method 90 according to an embodiment of the present invention. The synchronization method 90 between an active stylus (such as the active stylus 110A, 110B, or 110C) and a touch device (for example, the touch device 130 or 830) may include steps as follows:

Step S901: The touch device 130 determines whether the active stylus 110A approaches the touch device 130. If yes, go to Step S902; otherwise, repeat Step S901.

Step S902: The active stylus 110A receives an uplink signal from the touch device 130.

Step S903: The active stylus 110A determines whether the active stylus 110A is paired with the touch device 130. If yes, go to Step S912; otherwise, go to Step S904.

Step S904: The touch device 130 transmits one timing configuration signal to the active stylus 110A, wherein the timing configuration signal indicates part of or all of the timing parameter(s).

Step S905: The touch device 130 determines whether all (information of) the timing parameter(s) is/are transmitted to the active stylus 110A. If yes, go to Step 906; otherwise, go to Step S904.

Step S906: The touch device 130 receives one calibration downlink signal from the active stylus 110A.

Step S907: The touch device 130 determines whether calibration downlink timeslot(s) of the calibration downlink signal coincides/coincide with touch period(s) Ttp1 of the touch device 130. If yes, go to Step S909; otherwise, go to Step S908.

Step S908: The touch device 130 transmits one timing checking-and-adjusting signal to the active stylus 110A, wherein the timing checking-and-adjusting signal is configured to instruct the active stylus 110A to shift/adjust calibration downlink timeslot(s) of another calibration downlink signal to be transmitted.

Step S909: The active stylus 110A saves the (transmission) timing for the touch device 130 in a timing table.

Step S910: The touch device 130 receives one downlink signal from the active stylus 110A, wherein downlink timeslot(s) of the downlink signal coincides/coincide with touch period(s) Ttp1 of the touch device 130.

Step S912: The active stylus 110A configures the timing table.

In an embodiment, the touch device 130 may send an uplink signal, which is related to which (calibrated/optimum) timing parameter(s) the active stylus 110A should configure or which touch device the active stylus 110A is to be paired with, in Step S902. For example, the uplink signal may be configured to indicate to the active stylus 110A which timing table the active stylus 110A should select. Alternatively, the uplink signal may be configured to indicate the (transmission) timing of the active stylus 110A for the touch device 130. Alternatively, the uplink signal may be configured to ensure that the downlink timeslots (for instance, the downlink timeslots DLTS1 to DLTSn shown in FIG. 8) of a downlink signal coincide with the touch periods (for instance, the touch periods Ttp1 shown in FIG. 8) of the touch device 130. In another embodiment, the uplink signal may be the detect signal S302d shown in FIG. 9. In another embodiment, the active stylus 110A may transmit the response signal S302a shown in FIG. 9 so as to trigger the touch device 130 to send the uplink signal. In another embodiment, the active stylus 110A may transmit an instruction signal so as to instruct the touch device 130 to send the uplink signal in Step S902.

In Step S903, the active stylus 110A may determine whether the active stylus 110A is paired with (or calibrated against) the touch device 130. For example, the active stylus 110A may search for a timing table, which includes the (calibrated/optimum) transmission timing configured for the active stylus 110A to transmit operation downlink signal(s) to the touch device 130 properly after the active stylus 110A receives the uplink signal. If the active stylus 110A is able to find/configure the timing table for the touch device 130, the active stylus 110A is calibrated against the touch device 130. Otherwise, the active stylus 110A and the touch device 130 fail to pair up. Alternatively, if the (transmission) timing of the downlink signal from the active stylus 110A meets the timing requirements/configuration of the touch device 130, the active stylus 110A is calibrated against the touch device 130.

If the active stylus 110A fails to be paired with the touch device 130 or 830 (for example, the active stylus 110A is unable to find the timing table indicated by the touch device 130 or 830), the active stylus 110A and the touch device 130 may go through Steps S904 to S908 to make timing configuration/calibration. Afterwards, each of the downlink timeslots DLTS1 to DLTSn shown in FIG. 8 is able to overlap/coincide with one touch period Ttp1.

Then, in Step S909, the active stylus 110A may save/store the transmission timing (such as the calibrated/optimum timing parameter(s) of the active stylus 110A) for the touch device 130 in another timing table according to the results of the timing calibration process (in Steps S906 to S908). The active stylus 110A may be operated in the operation process (namely, Step S910) according to information in the timing table.

If the active stylus 110A has been calibrated against the touch device 130, the active stylus 110A, in Step S912, may load/select/configure the corresponding timing table, which may include the transmission timing (such as calibrated/optimum timing parameter(s)) for the touch device 130. As a result, each of the downlink timeslots DLTS1 to DLTSn shown in FIG. 8 is able to overlap/coincide with one touch period Ttp1. The active stylus 110A may be operated in the operation process (namely, Step S910) according to information in the timing table. In other words, if the active stylus 110A moves out of and then moves back into the detection range of the touch device 130, the active stylus 110A may resume the operation process without performing the timing configuration process (in Steps S904 to S905) and timing calibration process (in Steps S906 to S908) again.

Since the active stylus 110A may move from the touch device 130 to the touch device 830, the touch device 830 may perform the synchronization method 90 after the touch device 130 has performed the synchronization method 90 for a while. Specifically, the touch device 130 may go through Steps S901 to S910 (or Steps S901 to S903, S912, and S910). Subsequently, the touch device 830 may go through Steps S901 to S910 (or Steps S901 to S903, S912, and S910). That is to say, the active stylus 110A is able to be operated in the operation process along with the touch device 130 and/or 830. The active stylus 110A may transmit (operation) downlink signal(s) in the operation process to the touch device 130 according to the (calibrated/optimum) timing parameter(s) for the touch device 130 and transmit (operation) downlink signal(s) in the operation process to the touch device 830 according to the (calibrated/optimum) timing parameter(s) for the touch device 830.

Figure 13:
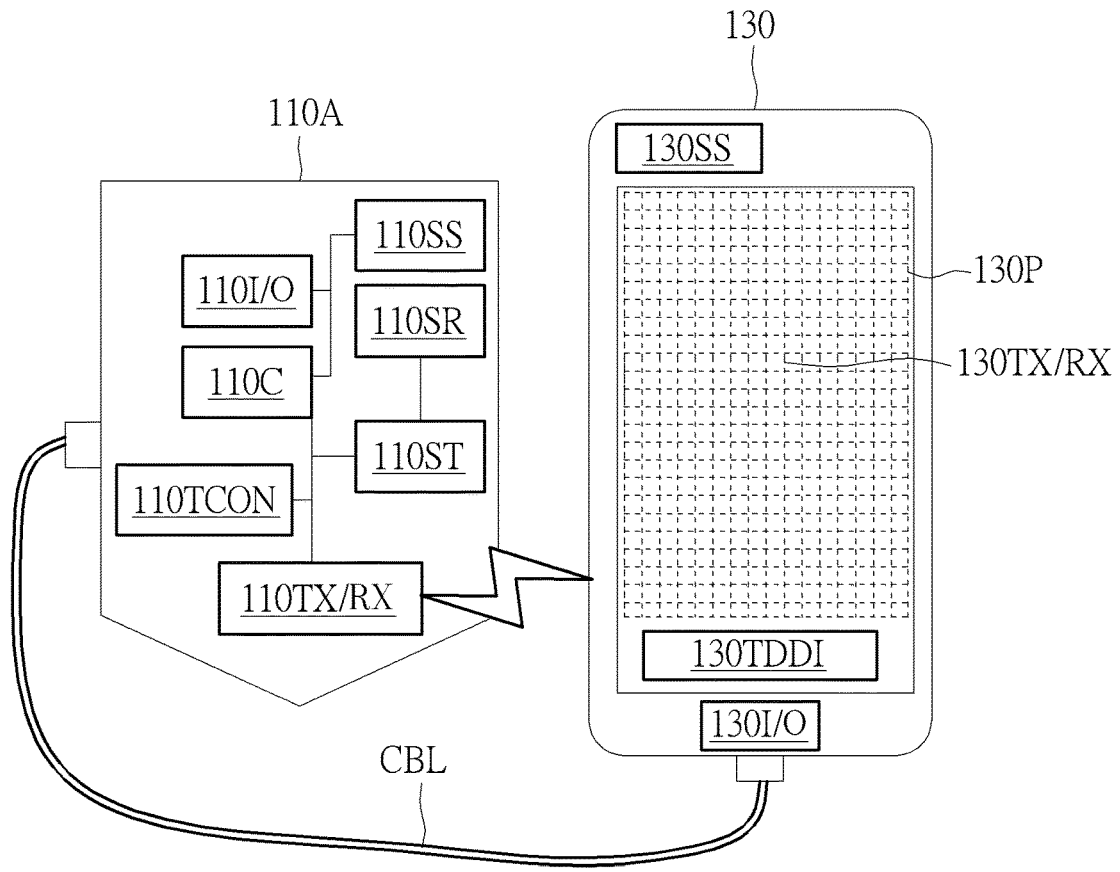
FIG. 13 is a schematic diagram of uplink/downlink transmission, wireless communication, or cable communication between a touch device and an active stylus according to an embodiment of the present invention.

The communication between an active stylus (such as the active stylus 110A, 110B, or 110C) and a touch device (for example, the touch device 130 or 830) may be implemented in various manners. For example, FIG. 13 is a schematic diagram of uplink/downlink transmission, wireless communication, or cable communication between the touch device 130 and the active stylus 110A according to an embodiment of the present invention.

The active stylus 110A may include a transceiver 110TX/RX, an input/output (I/O) interface 110I/O, a wireless communication circuit 110SS (which may support wireless communication technologies such as Bluetooth (BT), Wi-Fi, or near-field communication (NFC)), a controller 110C, a timing controller (TCON) 110TCON, a storage circuit 110ST (configured to store data), and/or a sensor 110SR. The active stylus 110A may be a stylus of active capacitive type, but is not limited thereto.

The touch device 130 may include a touch panel 130P with touch sensors 130TX/RX, an input/output interface 130I/O, a wireless communication circuit 130SS (which may support wireless communication technologies such as BT, Wi-Fi, or NFC), and/or a touch-and-display-driver-integrated-circuit 130TDDI. The touch device 130 may a mobile phone, a tablet, or a laptop, but is not limited thereto.

In an embodiment, to perform the synchronization method 90, the active stylus 110A may touch/hover over the touch device 130, such that signals may be transmitted between the transceiver 110TX/RX of the active stylus 110A and the touch panel 130P of the touch device 130. For example, the touch device 130 may transmit the detect signal S302d repeatedly or periodically through the touch sensor(s) 130TX/RX.

In an embodiment, to perform the synchronization method 90, the active stylus 110A may touch/hover over the touch device 130 as well. In an embodiment, the calibration downlink signals S308d1 to S308di (or the downlink signal(s) S312d) shown in FIG. 9 may be transmitted through the transceiver 110TX/RX of the active stylus 110A to the touch panel 130P of the touch device. In an embodiment, the detect signal(s) S302d, the response signal S302a, the timing configuration signals S304c1 to S304cm, the acknowledgements S304a1 to S304am, the timing configuration end signal S306e, the timing checking-and-adjusting signals S308c1 to S308ci, and/or the timing calibration end signal S310e shown in FIG. 9 may be transmitted through wireless communication technologies or a cable CBL connected between the input/output interface 110I/O of the active stylus 110A and the input/output interface 130I/O of the touch device 130, and thus may be transmitted faster than those transmitted through the transceiver 110TX/RX of the active stylus 110A. The touch device 130 may transmit the detect signal(s) S302d through the touch sensor(s) 130TX/RX, the input/output interface 110I/O, or the wireless communication circuit 130SS (immediately) after the touch device 130 finds the active stylus 110A using wireless communication technologies or the cable CBL.

In a word, the detect signal(s) S302d, the response signal S302a, the timing configuration signals S304c1 to S304cm, the acknowledgements S304a1 to S304am, the timing configuration end signal S306e, the calibration downlink signals S308d1 to S308di, the timing checking-and-adjusting signals S308c1 to S308ci, or the timing calibration end signal S310e may be transmitted by using wireless communication technologies, the cable CBL, or the touch panel 130P of the touch device 130.

Figure 14:
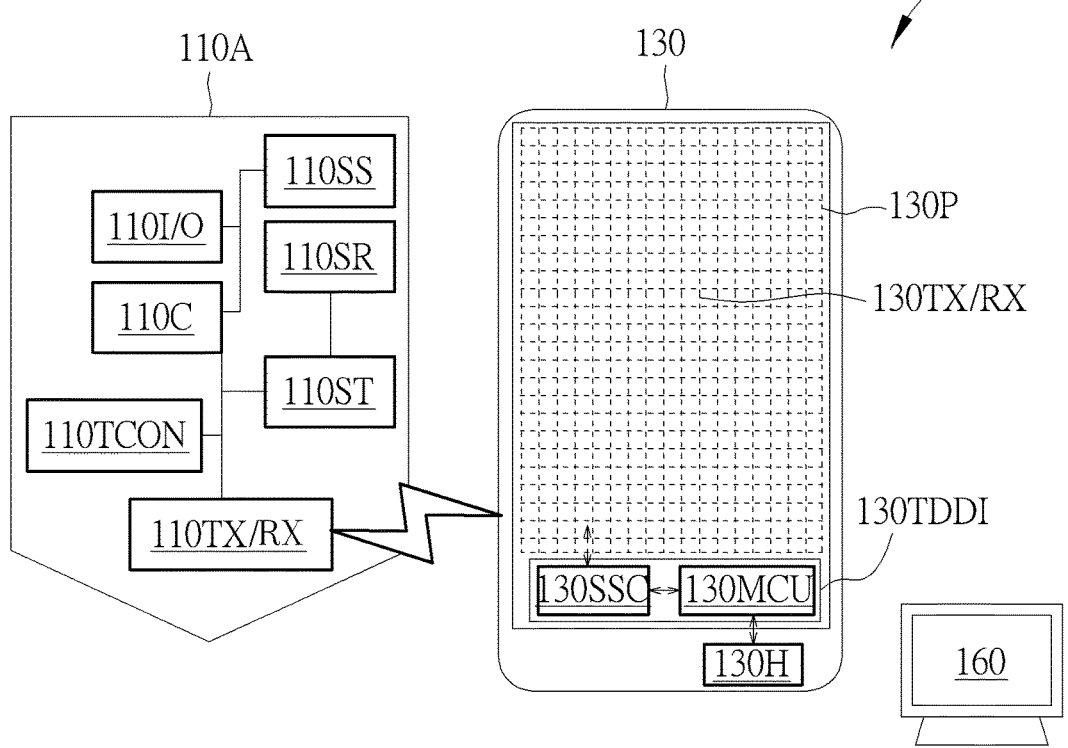
FIG. 14 is a schematic diagram of a system according to an embodiment of the present invention.

The synchronization method 90 may be performed in various manners. For example, FIG. 14 is a schematic diagram of a system 13 according to an embodiment of the present invention. The system 13 may include an active stylus (such as the active stylus 110A, 110B, or 110C), a touch device (for example, the touch device 130 or 830), and an external computing device 160. The touch device 130 may include a host processor 130H and the touch-and-display-driver-integrated-circuit 130TDDI. The touch-and-display-driver-integrated-circuit 130TDDI of the touch device 130 may include a controller 130MCU, which may be a microcontroller, and a sensor sensing circuit 130SSC. The synchronization method 90 may be controlled by the controller 130MCU, the host processor 130H, or the external computing device 160.

In other words, the timing calibration process may be triggered/initiated by the touch-and-display-driver-integrated-circuit 130TDDI, by the application processor of the touch device 130, or by the external computing device 160. The timing calibration process may be triggered/initiated according to a start signal sent into the input/output interface 110I/O of the active stylus 110A via the cable CBL.

The touch device 130 (or 830) may correspond to a platform, which is defined by which kind of application processor the touch device 130 includes and/or by which kind of touch panel 130P the touch device 130 includes. For example, the platform corresponding to the touch device 130 and the platform corresponding to the touch device 830 are different because the application processor of the touch device 130 (or the resolution of the touch panel 130P) differs from that of the touch device 830.

In summary, after a touch device detects an active stylus at a frame using an uplink signal conforming to a protocol for the active stylus, the touch device may transmit uplink signal(s) conforming to the protocol during all the following frames. The touch device may change the sequence of all protocols stored in the touch device from one repeat pattern (which is used before the active stylus is detected by the touch device) to another repeat pattern. After the active stylus moves out of the detection range of the touch device, the touch device may start stylus detection according to the new repeat pattern. The active stylus having just left the touch device may have priority in the new repeat pattern. In this manner, the active stylus 110B in the near future may suffer less from latency, thereby improving user experience.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A detection method, for a touch device, comprising:
   transmitting a first uplink signal of a plurality of first uplink signals, wherein the plurality of first uplink signals conform to a first protocol of a first active stylus; and
   transmitting a second uplink signal of a plurality of second uplink signals, wherein the plurality of second uplink signals conform to a second protocol of a second active stylus,
   wherein a chronological sequence of the first uplink signal and the second uplink signal is based at least in part on whether the first active stylus or the second active stylus has just left a detection range of the touch device.

2. The detection method of claim 1, wherein the first active stylus moves into a detection range of the touch device at a first time instant, the first active stylus receives the first uplink signal at a second time instant, a time length between the first time instant and the second time instant is related at least in part to whether the first active stylus has just left the detection range of the touch device or not.

3. The detection method of claim 1, wherein the touch device transmits the plurality of first uplink signals conforming to the first protocol of the first active stylus and the plurality of second uplink signals conforming to the second protocol of the second active stylus alternatively in a time interval without finding any active stylus, a first number of the plurality of first uplink signals or a second number of the plurality of second uplink signals is related at least in part to whether the first active stylus or the second active stylus has just left the detection range of the touch device.

4. The detection method of claim 1, wherein the chronological sequence of the first uplink signal and the second uplink signal according to a new repeat pattern is related at least in part to a first weighting of the first protocol, a second weighting of the second protocol, or a previous repeat pattern for transmitting another of the plurality of first uplink signals and another of the plurality of second uplink signals.

5. The detection method of claim 1, wherein the first uplink signal is transmitted after the first active stylus leaves the detection range of the touch device and before the second uplink signal is transmitted.

6. The detection method of claim 1, further comprising:
changing the chronological sequence of the first uplink signal and the second uplink signal after the first active stylus enters the detection range of the touch device, wherein changing the chronological sequence of the first uplink signal and the second uplink signal comprises:
changing a first weighting of the first protocol with respect to a second weighting of the second protocol; and
changing the chronological sequence of the first uplink signal and the second uplink signal according at least in part to the first weighting having been changed.

7. The detection method of claim 1, further comprising:
transmitting a third uplink signal conforming to a third protocol of a third active stylus; and
changing a first chronological sequence of the first uplink signal, the second uplink signal, and the third uplink signal after the first active stylus enters the detection range of the touch device, wherein changing the first chronological sequence of the first uplink signal, the second uplink signal, and the third uplink signal comprises:
changing a first weighting of the first protocol with respect to a second weighting of the second protocol and a third weighting of the third protocol after determining the first weighting of the first protocol is less than a parameter plus a sum of the second weighting of the second protocol and the third weighting of the third protocol; and
changing the first chronological sequence of the first uplink signal, the second uplink signal, and the third uplink signal according at least in part to the first weighting having been changed.

8. The detection method of claim 1, further comprising:
changing the chronological sequence of the first uplink signal and the second uplink signal after the first active stylus enters the detection range of the touch device, wherein changing the chronological sequence of the first uplink signal and the second uplink signal comprises:
changing a second weighting of the second protocol with respect to a first weighting of the first protocol; and
changing the chronological sequence of the first uplink signal and the second uplink signal according at least in part to the second weighting having been changed.

9. The detection method of claim 8, wherein changing the chronological sequence of the first uplink signal and the second uplink signal further comprises:
determining whether the second weighting of the second protocol is equal to or less than zero; and
converting the second weighting of the second protocol from a negative number or zero into one.

10. The detection method of claim 1, further comprising:
changing the chronological sequence of the first uplink signal and the second uplink signal after the first active stylus enters the detection range of the touch device, wherein changing the chronological sequence of the first uplink signal and the second uplink signal comprises:
determining whether a first weighting of the first protocol and a second weighting of the second protocol are equal to a value;
resetting the first weighting of the first protocol and the second weighting of the second protocol from the value to one; and
changing the chronological sequence of the first uplink signal and the second uplink signal back to an initial repeat pattern.

11. The detection method of claim 1, further comprising:
changing the chronological sequence of the first uplink signal and the second uplink signal after the first active stylus enters the detection range of the touch device, wherein changing the chronological sequence of the first uplink signal and the second uplink signal comprises:
resetting the first weighting of the first protocol and the second weighting of the second protocol to one after the touch device detects no active stylus within a time interval; and
changing the chronological sequence of the first uplink signal and the second uplink signal back to an initial repeat pattern.

12. A driving circuit, for a touch device, comprising:
a processing circuit, configured to direct steps of:
transmitting a first uplink signal conforming to a first protocol of a first active stylus; and
transmitting a second uplink signal conforming to a second protocol of a second active stylus, wherein a chronological sequence of the first uplink signal and the second uplink signal is based at least in part on whether the first active stylus or the second active stylus has just left a detection range of the touch device; and
a storage circuit, coupled to the processing circuit.

* * * * *

UNITED STATES PATENT AND TRADEMARK OFFICE
CERTIFICATE OF CORRECTION

| | |
|---|---|
| PATENT NO. | : 11,625,121 B2 |
| APPLICATION NO. | : 17/693403 |
| DATED | : April 11, 2023 |
| INVENTOR(S) | : Yen-Cheng Cheng et al. |

It is certified that error appears in the above-identified patent and that said Letters Patent is hereby corrected as shown below:

On the Title Page

Item (54) and in the Specification, Column 1, Line 1, correct the title of the invention from "Detection Method and Driving Circuit Thereof" to -- Detection Method for Active Styluses and Driving Circuit Thereof --.

Signed and Sealed this
Twenty-seventh Day of June, 2023

*Katherine Kelly Vidal*

Katherine Kelly Vidal
*Director of the United States Patent and Trademark Office*